United States Patent
Venturina et al.

(10) Patent No.: US 11,484,874 B2
(45) Date of Patent: Nov. 1, 2022

(54) CATALYTIC COATINGS, METHODS OF MAKING AND USE THEREOF

(71) Applicant: BASF QTech Inc., Mississauga (CA)

(72) Inventors: Roy Venturina, Iselin, NJ (US); Qingyuan Hu, East Brunswick, NJ (US); Jeffrey B. Hoke, Iselin, NJ (US); Pascaline Tran, Iselin, NJ (US)

(73) Assignee: BASF QTECH INC., Mississauga (CA)

( * ) Notice: Subject to any disclaimer, the term of this patent is extended or adjusted under 35 U.S.C. 154(b) by 145 days.

(21) Appl. No.: 16/955,223

(22) PCT Filed: Dec. 17, 2018

(86) PCT No.: PCT/US2018/065910
§ 371 (c)(1),
(2) Date: Jun. 18, 2020

(87) PCT Pub. No.: WO2019/125979
PCT Pub. Date: Jun. 27, 2019

(65) Prior Publication Data
US 2020/0330972 A1      Oct. 22, 2020

Related U.S. Application Data

(60) Provisional application No. 62/599,880, filed on Dec. 18, 2017.

(51) Int. Cl.
*B01J 35/00* (2006.01)
*B01J 21/18* (2006.01)
(Continued)

(52) U.S. Cl.
CPC ........... *B01J 35/0006* (2013.01); *B01J 21/18* (2013.01); *B01J 23/002* (2013.01); *B01J 23/005* (2013.01);
(Continued)

(58) Field of Classification Search
CPC .... B01J 35/0006; B01J 23/002; B01J 23/005; B01J 23/02; B01J 23/04; B01J 23/34; B01J 23/8892; B01J 37/0215; C09D 1/00
See application file for complete search history.

(56) References Cited

U.S. PATENT DOCUMENTS

2004/0152586 A1 *  8/2004  Ou ................ B01J 35/0006
                                                            502/64
2007/0190251 A1    8/2007  Abe et al.

FOREIGN PATENT DOCUMENTS

CN      104619789 A  *  5/2015  .......... B01J 23/8892
CN      104619789 A  *  4/2022
(Continued)

OTHER PUBLICATIONS

CN-104619789-A Google Patents Translation (Year: 2022).*
(Continued)

*Primary Examiner* — Anthony J Zimmer
*Assistant Examiner* — Logan Edward Laclair
(74) *Attorney, Agent, or Firm* — DLA Piper LLP (US)

(57) ABSTRACT

Described herein are coatings. The coatings can, for example, catalyze carbon gasification. In some examples, the coatings comprise: a first region having a first thickness, the first region comprising a manganese oxide, a chromium-manganese oxide, or a combination thereof; a second region having a second thickness, the second region comprising Ni, Fe, W, Cr, Co, Mn, Ti, Mo, V, Nb, Zr, Si, C, or a combination thereof; and an alkaline earth metal, an alkaline earth oxide, an alkaline earth carbonate, an alkaline earth silicate, molybdemun, a molybdenum oxide, a molybdenum carbide, a mixed-metal perovskite, a mixed metal inorganic oxide, or a combination thereof.

24 Claims, 7 Drawing Sheets

(51) Int. Cl.
  *B01J 23/00* (2006.01)
  *B01J 23/02* (2006.01)
  *B01J 23/04* (2006.01)
  *B01J 23/34* (2006.01)
  *B01J 23/83* (2006.01)
  *B01J 23/888* (2006.01)
  *B01J 23/889* (2006.01)
  *B01J 27/22* (2006.01)
  *B01J 27/232* (2006.01)
  *B01J 37/02* (2006.01)
  *B01J 37/08* (2006.01)

(52) U.S. Cl.
  CPC ............... *B01J 23/02* (2013.01); *B01J 23/04* (2013.01); *B01J 23/34* (2013.01); *B01J 23/83* (2013.01); *B01J 23/888* (2013.01); *B01J 23/8892* (2013.01); *B01J 27/22* (2013.01); *B01J 27/232* (2013.01); *B01J 37/0215* (2013.01); *B01J 37/08* (2013.01)

(56) References Cited

FOREIGN PATENT DOCUMENTS

| WO | 02/076724 A1 | 10/2002 | |
|----|----|----|----|
| WO | 2016/204698 A1 | 12/2016 | |
| WO | 2017/003904 A1 | 1/2017 | |
| WO | WO-2017003904 A1 * | 1/2017 | ........... B29C 70/382 |

OTHER PUBLICATIONS

International Search Report and Written Opinion from counterpart International Application No. PCT/US2018/065910 dated Mar. 25, 2019.

International Preliminary Report on Patentability from counterpart International Application No. PCT/US2018/065910 dated Jul. 2, 2020.

* cited by examiner

CATALYTIC COATINGS, METHODS OF MAKING AND USE THEREOF

CROSS-REFERENCE TO RELATED APPLICATIONS

This application claims the benefit of priority to U.S. Provisional Application No. 62/599,880, filed Dec. 18, 2017, which is hereby incorporated herein by reference in its entirety.

BACKGROUND

Coke is a natural by-product of the steam cracking process. Whether formed due to reaction of hydrocarbons with metallic elements such as Ni and Fe in the reactor tube wall (filamentous or catalytic coke) or by dehydrogenation of hydrocarbons in the gas phase (amorphous coke), the result is a continual accumulation of coke on the reactor tube walls. Over time, the coke layer builds to such an extent that decoking is required before the tube becomes entirely plugged. This is accomplished in an offline process whereby the hydrocarbon feed is shut off and air is gradually injected into the cracker to provide sufficient oxygen for coke oxidization. The length of time that the cracker can operate between decoking depends on many factors including the hydrocarbon feed (e.g., ethane vs. naphtha), steam to hydrocarbon ratio, and temperature of operation (i.e., severity of the cracking reaction). Liquid feeds or higher temperature operation leads to much higher production of coke, thereby reducing the time between decoking. Since the decoking process requires several days, cracker throughput is reduced leading to lost production and plant revenue. Thus, increasing the time that the cracker can operate between decoking is desired to maximize cracker efficiency and profit.

SUMMARY

Described herein are coatings and coating methods. The coatings described herein are deposited on a substrate and have two regions. A first region is the outermost region of the coating with respect to the substrate; this region is exposed to the processing atmosphere. Underlying the first region and immediately adjacent the substrate is a second region.

The first region of the coating can comprise a manganese oxide, a chromium-manganese oxide, or a combination thereof. In some examples, the coating, and particularly the first region, can catalyze carbon gasification.

In some embodiments, the first region includes a manganese oxide and the manganese oxide can, for example, be selected from the group consisting of MnO, $Mn_2O_3$, $Mn_3O_4$, $MnO_2$, and combinations thereof. In some examples, the manganese oxide can comprise $Mn_3O_4$. In some embodiments, the first region includes a chromium manganese oxide and the chromium manganese oxide can comprise a spinel chromium-manganese oxide, an inverse spinel chromium-manganese oxide, a non-stoichiometric chromium-manganese oxide, or a combination thereof. In some examples, the chromium-manganese oxide can comprise $MnCr_2O_4$, $CrMn_2O_4$, or combinations thereof.

The first region can have a first thickness. In some examples, the thickness of the first region can be from 0.1 microns to 20 microns (e.g., from 1 micron to 20 microns, from 2 microns to 20 microns, from 4 microns to 15 microns, from 5 microns to 12 microns, from 6 microns to 10 microns, or from 7 microns to 9 microns).

The second region of the coating can comprise Ni, Fe, W, Cr, Co, Mn, Ti, Mo. V Nb, Zr, Si, C, or a combination thereof. In some examples, the second region can comprise Ni in an amount of 15-45 wt %, W in an amount of 10-50 wt %, Cr in an amount of 1-15 wt %, Fe in an amount of 1-10 wt %, Mn in an amount of 1-20 wt %, Si in an amount of 1-15 wt %, Nb in an amount of 0-2 wt %, Mo in an amount of 0-15 wt %, Ti in an amount of 0-2 wt %, and Zr in amount of 0-2 wt %, based on the total weight of the second region.

In some examples, the second region of the coating can comprise $X_6W_6Z$, XWZ, or a combination thereof, wherein X is Ni or a mixture of Ni and one or more transition metals and Z is independently Si, C, or a combination thereof. The one or more transition metals can, for example, comprise Fe, Zr, Nb, Cr, Co, Mn, Ti, Mo, V, or a combination thereof.

The second region of the coating can, for example, comprise Si in an amount of from 1 wt % to 15 wt %, based on the total weight of the second region (e.g., from 3 wt % to 8 wt %). In some examples, the second region of the coating can comprise Mn in an amount of 1 wt % to 20 wt %, based on the total weight of the second region (e.g., from 5 wt % to 15 wt %).

The second region can have a second thickness. The second thickness can, for example, be from 50 microns to 1,200 microns (e.g., from 100 microns to 1,200 microns; from 100 microns to 1,000 microns: from 200 microns to 700 microns; from 200 microns to 500 microns; or from 300 microns to 500 microns).

The coatings can further comprise an alkaline earth metal, an alkaline earth oxide, an alkaline earth carbonate, an alkaline earth silicate, molybdenum, a molybdenum oxide, a molybdenum carbide, a mixed-metal perovskite, a mixed metal inorganic oxide, or a combination thereof. The alkaline earth metal, the alkaline earth oxide, the alkaline earth carbonate, the alkaline earth silicate, or a combination thereof can comprise, for example, Mg, Ca, Sr, Ba, or a combination thereof. In some examples, the alkaline earth oxide can be selected from the group consisting of MgO, CaO, SrO, BaO, and combinations thereof. In some examples, the alkaline earth silicate can be selected from the group consisting of $MgSiO_3$, $CaSiO_3$, $SrSiO_3$, $BaSiO_3$, or a combination thereof. In some examples, the coating includes strontium, strontium silicate or strontium oxide. In some examples, the alkaline earth carbonate can be selected from the group consisting of $MgCO_3$, $CaCO_3$, $SrCO_3$, $BaCO_3$, and combinations thereof. The coating can, for example, comprise the alkaline earth metal, alkaline earth oxide, alkaline earth carbonate, alkaline earth silicate, or a combination thereof in an amount of from 0.5 wt % to 20 wt % based on the total weight of the coating (e.g., from 0.5 wt % to 10 wt %, or from 1 wt % to 5 wt %)

In some examples, the coating can include a molybdenum oxide comprising $MoO_2$, $MoO_3$, or a combination thereof. In some examples, the coating can include a molybdenum carbide comprising MoC. The coating can, for example, comprise molybdenum, a molybdenum oxide, a molybdenum carbide, or a combination thereof in an amount of from 0.5 wt % to 20 wt % based on the total weight of the coating (e.g., from 0.5 wt % to 10 wt %, or from 1 wt % to 5 wt %). In some examples, the coating can include a mixed metal perovskite, the mixed metal perovskite comprising a first metal and a second metal. The first metal and the second metal can, for example, be selected from the group consisting of Mg, Al, Ca, Sc, Ti, V, Cr, Mn, Fe, Co, Ni, Cu, Zn, Ga. Sr, Y, Zr, Nb, Mo, Ru, Rh, Pd, Ag, In, Sn, Ba, Ta, W. Re, Ir, Pt, Au, Bi, La, Ce, Pr, Nd, and combinations thereof. In some examples, the first metal and the second metal are selected from the group consisting of Al, Ca, Ti, Mn Fe, Co, Sr, Y, Zr, Ba, La Ce, Pr, Nd, and combinations thereof. Examples of mixed metal perovskites include, but are not limited to, $SrCoO_3$, $La_ySr_{1-y}CoO_3$, $La_ySr_{1-y}FeO_3$, $La_ySr_{1-y}MnO_3$, $La_yCa_{1-y}MnO_3$, $Pr_yCa_{1-y}MnO_3$, $BaZrO_3$, $BaTiO_3$, and combinations thereof, wherein y can be from 0.2 to 1 (e.g., from 0.4 to 0.8). The coating can, for example, comprise the mixed metal perovskite in an amount of from 0.5 wt % to 20 wt % based on the total weight of the coating (e.g., from 0.5 wt % to 10 wt %, or from wt % to 5 wt %).

In some examples, the coating can include a mixed metal inorganic oxide, wherein the mixed metal inorganic oxide comprises a first metal and a second metal. The first metal and the second metal can, for example, be selected from the group consisting of Mg, Al, Ca, Sc, Ti, V, Cr, Mn, Fe, Co, Ni, Cu, Zn, Ga, Sr, Y, Zr, Nb, Mo, Ag, In, Sn. Ba, Ta, W, Re, Au, Bi, La, Ce, Pr, Nd, and combinations thereof. In some examples, the first metal and the second metal are selected from the group consisting of Al, Ca, Ti, Mn, Fe, Co, Sr, Y, Zr, Ba, La, Ce, Pr, Nd, and combinations thereof. The mixed metal inorganic oxide can, for example, comprise $CaMnO_3$; $BaCexZr_{1-x}O_3$, wherein x can be from 0 to 1; or a combination thereof. The coating can, for example comprise the mixed metal inorganic oxide in an amount of from 0.5 wt % to 20 wt % based on the total weight of the coating (e.g., from 0.5 wt % to 10 wt %, or from 1 wt % to 5 wt %).

Also disclosed herein are substrates, said substrates having a surface, wherein any of the coatings described herein are provided as a coating on the surface of the substrates, wherein the second region is adjacent the surface of the substrate, and the first region is adjacent the second region. The substrate can, for example, be made from a high temperature alloy (HTA). In some examples, the HTA can comprise a nickel-chromium-based alloy (e.g., an austenitic steel), a nickel-cobalt-based superalloy, or a combination thereof.

Also disclosed herein are methods of making the coatings and coated substrates described herein. The methods of making the coatings can comprise applying a mixture of powders to the surface of the substrate. The mixture of powders can comprise a first metal powder comprising Ni, Fe, W, Cr, Co, Mn, Ti, Mo, V, Nb, Zr, Si, C, or a combination thereof; and a second powder comprising an alkaline earth metal, an alkaline earth oxide, an alkaline earth carbonate, an alkaline earth silicate, molybdenum, a molybdenum oxide, a molybdenum carbide, a mixed-metal perovskite, a mixed metal inorganic oxide, or a combination thereof. The methods further comprise heating the mixture of powders applied to the surface of the substrate in the absence of oxygen under vacuum or under an inert atmosphere to form an initial coating on the surface of the substrate. In some examples, the initial coating on the substrate can be further subjected to oxidation at high temperature to generate a surface oxide, thereby forming a coating on the substrate. The coating can, for example comprise any of the coatings described herein.

Additional advantages of the disclosed compositions and methods will be set forth in part in the description which follows, and in part will be obvious from the description. The advantages of the disclosed compositions will be realized and attained by means of the elements and combinations particularly pointed out in the appended claims. It is to be understood that both the foregoing general description and the following detailed description are exemplary and explanatory only and are not restrictive of the disclosed compositions, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
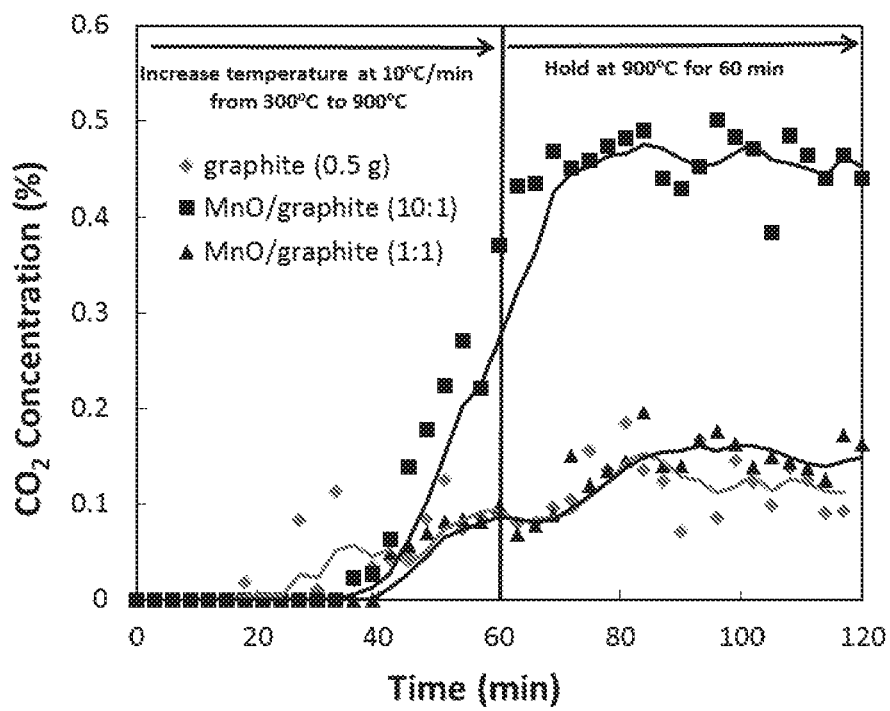
FIG. 1 shows the concentration of $CO_2$ evolved from a mixture of graphite and MnO at 900° C. in an atmosphere of 75% steam/nitrogen as a function of the MnO:graphite ratio.

The compositions and methods described herein may be understood more readily by reference to the following detailed description of specific aspects of the disclosed subject matter and the examples included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

In this specification and in the claims that follow, reference will be made to a number of terms, which shall be defined to have the following meanings.

Throughout the description and claims of this specification, the words "comprise," "include," and other forms of these words, such as "comprising," "comprises," "including," and "includes" are open, non-limiting terms and do not exclude additional elements such as, for example, additional additives, components, integers, or steps. Although the terms "comprising" and "including" have been used herein to describe various embodiments, the terms "consisting essentially of" and "consisting of" can be used in place of "comprising" and "including" to provide for more specific embodiments and are also disclosed.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Olefin production through hydrocarbon steam cracking is highly energy and capital intensive. One detrimental consequence of the cracking process is the formation of coke. Coke deposits in cracking coils, quench exchangers, and other downstream equipment which can result in: loss of heat transfer and thermal efficiency, carburization of coils and components, high maintenance costs and reduced furnace availability, high pressure drop, reduction in furnace throughput, and reduced production yield. In a conventional uncoated cracking coil, nickel and iron in the bulk tube metal (typically austenitic steel) act as catalysts for coke formation. Coke formed in the gas phase can also deposit on the coating surface.

Described herein are coatings and coating methods. In some examples, the coatings can block formation of filamentous coke (i.e. passivating the steel tube surface) and oxidize deposited amorphous coke during normal cracking operation, which can thereby reduce the overall build-up of coke in cracking coils, quench exchangers, and/or other downstream equipment. The coatings described herein can, in some examples, be used to protect pipe and equipment for other, non-olefin production processes in which coke formation is undesirable. The coatings described herein can increase cracker runtime between decoking and have a negligible impact on olefin product consumption, and further have appreciable coke gasification benefit under high coking environments (e.g., naphtha or high severity ethane cracking).

The coatings described herein are deposited on a substrate and have two regions. A first region is the outermost region of the coating with respect to the substrate; this region is exposed to the processing atmosphere. Underlying the first region and immediately adjacent the substrate is a second region.

The first region of the coating can comprise a manganese oxide, a chromium-manganese oxide, or a combination thereof. In some examples, the coating, and particularly the first region, can catalyze carbon gasification.

The manganese oxide can, for example, be selected from the group consisting of MnO, $Mn_2O_3$, $Mn_3O_4$, $MnO_2$, and combinations thereof. In some examples, the manganese oxide can comprise $Mn_3O_4$. In some examples, the manganese oxide can comprise MnO.

The chromium manganese oxide can, for example, have a spinel or an inverse spinel structure. In some examples, the chromium manganese oxide can be non-stoichiometric. In some examples, the chromium manganese oxide can comprise $Mn_aCr_{3-a}O_4$, wherein $0.5 \leq a < 3$. In some examples of $Mn_aCr_{3-a}O_4$, a can be 0.5 or more (e.g., 0.6 or more, 0.7 or more, 0.8 or more, 0.9 or more, 1.0 or more, 1.1 or more, 1.2 or more, 1.3 or more, 1.4 or more, 1.5 or more, 1.6 or more, 1.7 or more, 1.8 or more, 1.9 or more, 2.0 or more, 2.1 or more, 2.2 or more, 2.3 or more, 2.4 or more, 2.5 or more, 2.6 or more, 2.7 or more, or 2.8 or more). In some examples of $Mn_aCr_{3-a}O_4$, a can be less than 3.0 (e.g., 2.9 or less, 2.8 or less, 2.7 or less, 2.6 or less, 2.5 or less, 2.4 or less, 2.3 or less, 2.2 or less, 2.1 or less, 2.0 or less, 1.9 or less, 1.8 or less, 1.7 or less, 1.6 or less, 1.5 or less, 1.4 or less, 1.3 or less, 1.2 or less, 1.1 or less, 1.0 or less, 0.9 or less, 0.8 or less, 0.7 or less, or 0.6 or less). In certain examples, the chromium manganese oxide can comprise $MnCr_2O_4$, $CrMn_2O_4$, or combinations thereof.

The first region can have a first thickness. In some examples, the first region is a continuous region. In some examples, the first region is a non-continuous region, for example, due to chipping away or incomplete formation of the first region. In some examples, the thickness of the first region, where it is present, can be 0.1 micrometers (microns) or more (e.g., 0.5 microns or more, 1 micron or more, 1.5 microns or more, 2 microns or more, 3 microns or more, 3.5 microns or more, 4 microns or more, 4.5 microns or more, 5 microns or more, 6 microns or more, 7 microns or more, 8 microns or more, 9 microns or more, 10 microns or more, 11 microns or more, 12 microns or more, 13 microns or more, 14 microns or more, 15 microns or more, 16 microns or more, 17 microns or more, or 18 microns or more). In some examples, the thickness of the first region can be 20 microns or less (e.g., 19 microns or less, 18 microns or less, 17 microns or less, 16 microns or less, 15 microns or less, 14 microns or less, 13 microns or less, 12 microns or less, 11 microns or less, 10 microns or less, 9 microns or less, 8 microns or less, 7 microns or less, 6 microns or less, 5 microns or less, 4 microns or less, 3 microns or less, 2 microns or less, 1 micron or less). The thickness of the first region can range from any of the minimum values described above to any of the maximum values described above. For example, the thickness of the first region can be from 0.1 microns to 20 microns (e.g., from 1 micron to 20 microns, from 2 microns to 20 microns, from 4 microns to 15 microns, from 5 microns to 12 microns, from 6 microns to 10 microns, or from 7 microns to 9 microns).

The second region of the coating can comprise Ni, Fe, W. Cr, Co, Mn, Ti, Mo, V, Nb, Zr, Si, C, or a combination thereof. In some examples, the second region can comprise Ni in an amount of 15-45 wt %, W in an amount of 10-50 wt %, Cr in an amount of 1-15 wt %, Fe in an amount of 1-10 wt %, Mn in an amount of 1-20 wt %, Si in an amount of 1-15 wt %, Nb in an amount of 0-2 wt %, Mo in an amount of 0-15 wt %, Ti in an amount of 0-2 wt %, and Zr in amount of 0-2 wt %, based on the total weight of the second region.

In some examples, the second region of the coating can comprise $X_6W_6Z$ (i.e., $X_6W_6Z_1$, which can also be referred to as the "661" phase), XWZ (i.e., $X_1W_1Z_1$, which can also be referred to as the "11" phase), or a combination thereof, wherein X is Ni or a mixture of Ni and one or more transition metals and Z is independently Si, C, or a combination thereof. The one or more transition metals can, for example, comprise Fe, Zr, Nb, Cr, Co, Mn, Ti, Mo. V. or a combination thereof.

The second region of the coating can, for example, comprise Si in an amount of 1 wt % or more, based on the total weight of the second region (e.g., 1.5 wt % or more, 2 wt % or more, 2.5 wt % or more, 3 wt % or more, 3.5 wt % or more, 4 wt % or more, 4.5 wt % or more, 5 wt % or more, 5.5 wt % or more, 6 wt % or more, 6.5 wt % or more, 7 wt % or more, 7.5 wt % or more, 8 wt % or more, 8.5 wt % or more, 9 wt % or more, 9.5 wt % or more, 10 wt % or more, 10.5 wt % or more, 11 wt % or more, 11.5 wt % or more, 12 wt % or more, 12.5 wt % or more, or 13 wt % or more). In some examples, the second region of the coating can comprise Si in an amount of 15 wt % or less, based on the total weight of the second region (e.g., 14.5 wt % or less, 14 wt % or less, 13.5 wt % or less, 13 wt % or less, 12.5 wt % or less, 12 wt % or less, 11.5 wt % or less, 11 wt % or less, 10.5 wt % or less, 10 wt % or less, 9.5 wt % or less, 9 wt % or less, 8.5 wt % or less, 8 wt % or less, 7.5 wt % or less, 7 wt % or less, 6.5 wt % or less, 6 wt % or less, 5.5 wt % or less, 5 wt % or less, 4.5 wt % or less, 4 wt % or less, 3.5 wt % or less, 3 wt % or less, 2.5 wt % or less, or 2 wt % or less). The amount of Si in the second region can range from any of the minimum values described above to any of the maximum values described above. For example, the second region of the coating can comprise Si in an amount of from 1 wt % to 15 wt % based on the total weight of the second region (e.g., from 1 wt % to 10 wt %, from 1.5 wt % to 9.5 wt %, from 2 wt % to 9 wt %, from 2.5 wt % to 8.5 wt %, or from 3 wt % to 8 wt %).

In some examples, the second region of the coating can comprise Mn in an amount of 1 wt % or more, based on the total weight of the second region (e.g., 1.5 wt % or more, 2 wt % or more, 2.5 wt % or more, 3 wt % or more, 3.5 wt % or more, 4 wt % or more, 4.5 wt % or more, 5 wt % or more, 5.5 wt % or more, 6 wt % or more, 6.5 wt % or more, 7 wt % or more, 7.5 wt % or more, 8 wt % or more, 8.5 wt % or more, 9 wt % or more, 9.5 wt % or more, 10 wt/o or more, 11 wt % or more, 12 wt % or more, 13 wt % or more, 14 wt % or more, 15 wt % or more, 16 wt % or more, 17 wt % or more, or 18 wt % or more). In some examples, the second region of the coating can comprise Mn in an amount of 20 wt % or less, based on the total weight of the second region (e.g., 19 wt % or less, 18 wt % or less, 17 wt % or less, 16 wt % or less, 15 wt % or less, 14 wt % or less, 13 wt % or less, 12 wt % or less, 11 wt % or less, 10 wt % or less, 9.5 wt % or less, 9 wt % or less, 8.5 wt % or less, 8 wt % or less, 7.5 wt % or less, 7 wt % or less, 6.5 wt % or less, 6 wt % or less, 5.5 wt % or less, 5 wt % or less, 4.5 wt % or less, 4 wt % or less, 3.5 wt % or less, 3 wt % or less, 2.5 wt % or less, or 2 wt % or less). The amount of Mn in the second region of the coating can range from any of the minimum values described above to any of the maximum values described above. For example, the second region of the coating can comprise Mn in an amount of from 1 wt % to 20 wt % based on the total weight of the second region (e.g., from 1 wt % to 19 wt %, from 2 wt % to 18 wt %, from 3 wt % to 17 wt %, from 4 wt % to 16 wt %, or from 5 wt % to 15 wt %).

The second region can have a second thickness. The second thickness can, for example, be 50 microns or more (e.g., 100 microns or more; 150 microns or more; 200 microns or more; 250 microns or more; 300 microns or more: 350 microns or more 400 microns or more; 450 microns or more: 500 microns or more: 550 microns or more; 600 microns or more; 650 microns or more; 700 microns or more: 750 microns or more; 800 microns or more; 850 microns or more: 900 microns or more: 1,000 microns or more 1,050 microns or more: or 1,100 microns or more). In some examples, the second thickness can be 1,200 microns or less (e.g., 1.150 microns or less; 1,100 microns or less: 1,050 microns or less; 1,000 microns or less; 950 microns or less: 900 microns or less; 850 microns or less; 800 microns or less; 750 microns or less; 700 microns or less; 650 microns or less: 600 microns or less: 550 microns or less; 500 microns or less; 450 microns or less; 400 microns or less: 350 microns or less; 300 microns or less: 250 microns or less; 200 microns or less; 150 microns or less; or 100 microns or less). The thickness of the second region can range from any of the minimum values described above to any of the maximum values described above. For example, the second thickness can be from 50 microns to 1,200 microns (e.g., from 100 microns to 1,200 microns; from 100 microns to 1,000 microns; from 200 microns to 700 microns; from 200 microns to 500 microns; or from 300 microns to 500 microns).

The coatings can further comprise an alkaline earth metal, an alkaline earth oxide, an alkaline earth carbonate, an alkaline earth silicate, molybdenum, a molybdenum oxide, a molybdenum carbide, a mixed-metal perovskite, a mixed metal inorganic oxide, or a combination thereof. The alkaline earth metal, alkaline earth oxide, alkaline earth carbonate, alkaline earth silicate, molybdenum, molybdenum oxide, molybdenum carbide, mixed-metal perovskite, mixed metal inorganic oxide, or combination thereof can be present in the first region, the second region, or a combination thereof. The presence of the alkaline earth metal, alkaline earth oxide, alkaline earth carbonate, alkaline earth silicate, molybdenum, molybdenum oxide, molybdenum carbide, mixed-metal perovskite, mixed metal inorganic oxide, or combination thereof in the coating (e.g., in the first region and/or the second region) can, for example, improve the coke gasification of the coating. The desired level of coke gasification activity relative to unwanted consumption of cracking products such as ethylene or propylene can be optimized by adjusting the level of the alkaline earth metal, alkaline earth oxide, alkaline earth carbonate, alkaline earth silicate, molybdenum, molybdenum oxide, molybdenum carbide, mixed-metal perovskite, mixed metal inorganic oxide, or a combination thereof present in the coating.

The alkaline earth metal, alkaline earth oxide, alkaline earth carbonate, alkaline earth silicate, or a combination thereof can comprise, for example, Mg, Ca, Sr, Ba, or a combination thereof. In some examples, the alkaline earth oxide can be selected from the group consisting of MgO, CaO, SrO, BaO, and combinations thereof. In some examples, the alkaline earth silicate can be selected from the group consisting of $MgSiO_3$, $CaSiO_3$, $SrSiO_3$, $BaSiO_3$, and combinations thereof. In some examples, the coating includes strontium, strontium silicate or strontium oxide. In some examples, the alkaline earth carbonate can be selected from the group consisting of $MgCO_3$, $CaCO_3$, $SrCO_3$, $BaCO_3$, and combinations thereof.

The coating can, for example, comprise an alkaline earth metal, an alkaline earth oxide, an alkaline earth carbonate, an alkaline earth silicate, or a combination thereof in an amount of 0.5 wt % or more, based on the total weight of the coating (e.g., 1 wt % or more, 1.5 wt % or more, 2 wt % or more, 2.5 wt % or more, 3 wt % or more, 3.5 wt/o or more, 4 wt % or more, 4.5 wt % or more, 5 wt or more, 5.5 wt % or more, 6 wt % or more, 6.5 wt % or more, 7 wt % or more, 7.5 wt % or more, 8 wt % or more, 8.5 wt % or more, 9 wt % or more, 9.5 wt % or more, 10 wt % or more, 11 wt % or more, 12 wt % or more, 13 wt % or more, 14 wt % or more, 15 wt % or more, 16 wt % or more, 17 wt % or more, or 18 wt % or more). In some examples, the coating can comprise an alkaline earth metal, an alkaline earth oxide, an alkaline earth carbonate, an alkaline earth silicate, or a combination thereof in an amount of 20 wt % or less, based on the total weight of the coating (e.g., 19 wt % or less, 18 wt % or less, 17 wt % or less, 16 wt % or less, 15 wt % or less, 14 wt % or less, 13 wt % or less, 12 wt % or less, 11 wt % or less, 10 wt % or less, 9.5 wt % or less, 9 wt % or less, 8.5 wt % or less, 8 wt % or less, 7.5 wt % or less, 7 wt % or less, 6.5 wt % or less, 6 wt % or less, 5.5 wt % or less, 5 wt % or less, 4.5 wt % or less, 4 wt % or less, 3.5 wt % or less, 3 wt % or less, 2.5 wt % or less, or 2 wt % or less). The amount of alkaline earth metal, alkaline earth oxide, alkaline earth carbonate, alkaline earth silicate, or combination thereof in the coating can range from any of the minimum values described above to any of the maximum values described above. For example, the coating can comprise an alkaline earth metal, an alkaline earth oxide, an alkaline earth carbonate, an alkaline earth silicate, or a combination thereof in an amount of from 0.5 wt % to 20 wt % based on the total weight of the coating (e.g., from 0.5 wt % to 15 wt %, from 0.5 wt % to 10 wt %, from 0.5 wt % to 7.5 wt %, or from 1 wt % to 5 wt %).

In some embodiments, the alkaline earth metal, alkaline earth oxide, alkaline earth carbonate, or alkaline earth silicate can include strontium, strontium silicate, or strontium oxide in the amounts provided above.

The coatings can comprise molybdenum, a molybdenum oxide, a molybdenum carbide, or combinations thereof. In some examples, the coating can include a molybdenum oxide comprising $MoO_2$, $MoO_3$, or a combination thereof. In some examples, the coating can include a molybdenum carbide comprising MoC. The coating can, for example, comprise molybdenum, a molybdenum oxide, a molybdenum carbide, or combinations thereof in an amount of 0.5 wt % or more, based on the total weight of the coating (e.g., 1 wt % or more, 1.5 wt % or more, 2 wt or more, 2.5 wt % or more, 3 wt % or more, 3.5 wt % or more, 4 wt % or more, 4.5 wt % or more, 5 wt % or more, 5.5 wt % or more, 6 wt % or more, 6.5 wt % or more, 7 wt % or more, 7.5 wt % or more, 8 wt % or more, 8.5 wt % or more, 9 wt % or more, 9.5 wt % or more, 10 wt % or more, 11 wt % or more, 12 wt % or more, 13 wt % or more, 14 wt % or more, 15 wt % or more, 16 wt % or more, 17 wt % or more, or 18 wt % or more). In some examples, the coating can comprise molybdenum, a molybdenum oxide, a molybdenum carbide, or combinations thereof in an amount of 20 wt % or less, based on the total weight of the coating (e.g., 19 wt % or less, 18 wt % or less, 17 wt % or less, 16 wt % or less, 15 wt % or less, 14 wt % or less, 13 wt % or less, 12 wt % or less, 11 wt % or less, 10 wt % or less, 9.5 wt % or less, 9 wt % or less, 8.5 wt % or less, 8 wt % or less, 7.5 wt % or less, 7 wt % or less, 6.5 wt % or less, 6 wt % or less, 5.5 wt % or less, 5 wt % or less, 4.5 wt % or less, 4 wt % or less, 3.5 wt % or less, 3 wt % or less, 2.5 wt % or less, or 2 wt % or less). The amount of molybdenum, a molybdenum oxide, a molybdenum carbide, or combinations thereof in the coating can range from any of the minimum values described above to any of the maximum values described above. For example, the coating can comprise molybdenum, a molybdenum oxide, a molybdenum carbide, or combinations thereof in an amount of from 0.5 wt % to 20 wt % based on the total weight of the coating (e.g., from 0.5 wt % to 15 wt %, from 0.5 wt % to 10 wt %, from 0.5 wt % to 7.5 wt %, or from 1 wt % to 5 wt %).

In some examples, the coating can include a mixed metal perovskite. As used herein, a mixed metal perovskite includes the class of compounds having the same type of crystal structure as $CaTiO_3$. Perovskites are described, for example, in U.S. Pat. No. 9,499,747. The mixed metal perovskites can comprise a first metal and a second metal. The first metal and the second metal can, for example, be selected from the group consisting of Mg, Al, Ca, Sc, Ti, V, Cr, Mn, Fe, Co, Ni, Cu, Zn, Ga. Sr, Y. Zr, Nb, Mo, Ru, Rh, Pd, Ag, In, Sn. Ba, Ta, W, Re, Ir, Pt, Au, Bi, La, Ce, Pr, Nd, and combinations thereof. In some examples, the first metal and the second metal are selected from the group consisting of Al, Ca, Ti, Mn, Fe, Co, Sr, Y, Zr, Ba, La, Ce, Pr, Nd, and combinations thereof. Examples of mixed metal perovskites include, but are not limited to, $SrCoO_3$, $La_ySr_{1-y}CoO_3$, $La_ySr_{1-y}FeO_3$, $La_ySr_{1-y}MnO_3$, $La_yCa_{1-y}MnO_3$, $Pr_yCa_{1-y}MnO_3$, $BaZrO_3$, $BaTiO_3$, and combinations thereof, wherein y can be from 0.2 to 1.

For example, the mixed metal perovskite can comprise $SrCoO_3$, $La_ySr_{1-y}CoO_3$, $La_ySr_{1-y}FeO_3$, $La_ySr_{1-y}MnO_3$, $La_yCa_{1-y}MnO_3$, $Pr_yCa_{1-y}MnO_3$, $BaZrO_3$, $BaTiO_3$, or combinations thereof, wherein y can be 0.2 or more (e.g., 0.3 or more, 0.4 or more, 0.5 or more, 0.6 or more, 0.7 or more, or 0.8 or more). In some examples, the mixed metal perovskite can comprise $SrCo_3$, $La_ySr_{1-y}CoO_3$, $La_ySr_{1-y}FeO_3$, $La_ySr_{1-y}MnO_3$, $La_yCa_{1-y}MnO_3$, $Pr_yCa_{1-y}MnO_3$, $BaZr_3$, $BaTiO_3$, or combinations thereof, wherein y can be 1 or less (e.g., 0.9 or less, 0.8 or less, 0.7 or less, 0.6 or less, 0.5 or less, or 0.4 or less). The value of y in the mixed metal perovskite comprising $SrCo_3$, $La_ySr_{1-y}Co_3$, $La_ySr_{1-y}FeO_3$, $La_ySr_{1-y}MnO_3$, $La_yCa_{1-y}MnO_3$, $Pr_yCa_{1-y}Mn_3$, $BaZO_3$, $BaTiO_3$, or combinations thereof, can range from any of the minimum values described above to any of the maximum values described above. For example, the mixed metal perovskite can comprise $SrCo_3$, $La_ySr_{1-y}CoO_3$, $La_ySr_{1-y}FeO_3$, $La_ySr_{1-y}MnO_3$, $La_yCa_{1-y}MnO_3$, $Pr_yCa_{1-y}MnO_3$, $BaZrO_3$, $BaTiO_3$, or combinations thereof, wherein y can be from 0.2 to 1 (e.g., from 0.2 to 0.6, from 0.6 to 1, from 0.3 to 0.9, or from 0.4 to 0.8).

The coating can, for example, comprise the mixed metal perovskite in an amount of 0.5 wt % or more, based on the total weight of the coating (e.g., 1 wt % or more, 1.5 wt % or more, 2 wt % or more, 2.5 wt % or more, 3 wt % or more, 3.5 wt % or more, 4 wt % or more, 4.5 wt % or more, 5 wt % or more, 5.5 wt % or more, 6 wt % or more, 6.5 wt % or more, 7 wt % or more, 7.5 wt % or more, 8 wt % or more, 8.5 wt % or more, 9 wt % or more, 9.5 wt % or more, 10 wt % or more, 11 wt % or more, 12 wt % or more, 13 wt % or more, 14 wt % or more, 15 wt % or more, 16 wt % or more, 17 wt % or more, or 18 wt % or more). In some examples, the coating can comprise the mixed metal perovskite in an amount of 20 wt % or less, based on the total weight of the coating (e.g., 19 wt % or less, 18 wt % or less, 17 wt % or less, 16 wt % or less, 15 wt % or less, 14 wt % or less, 13 wt % or less, 12 wt % or less, 11 wt % or less, 10 wt % or less, 9.5 wt % or less, 9 wt % or less, 8.5 wt % or less, 8 wt % or less, 7.5 wt % or less, 7 wt % or less, 6.5 wt % or less, 6 wt % or less, 5.5 wt % or less, 5 wt % or less, 4.5 wt % or less, 4 wt % or less, 3.5 wt % or less, 3 wt % or less, 2.5 wt % or less, or 2 wt % or less). The amount of mixed metal perovskite in the coating can range from any of the minimum values described above to any of the maximum values described above. For example, the coating can comprise the mixed metal perovskite in an amount of from 0.5 wt % to 20 wt % based on the total weight of the coating (e.g., from 0.5 wt % to 15 wt %, from 0.5 wt % to 10 wt %, from 0.5 wt % to 7.5 wt %, or from 1 wt % to 5 wt %).

In some examples, the coating can include a mixed metal inorganic oxide. In some examples, the mixed metal inorganic oxides have a crystal structure other than a perovskite structure. The mixed metal inorganic oxides can comprise a first metal and a second metal. The first metal and the second metal can, for example, be selected from the group consisting of Mg, Al, Ca, Sc, Ti, V, Cr, Mn, Fe, Co, Ni, Cu, Zn, Ga, Sr, Y, Zr, Nb, Mo, Ag, In, Sn, Ba. Ta, W, Re, Au, Bi, La, Ce, Pr, Nd, and combinations thereof. In some examples, the first metal and the second metal are selected from the group consisting of Al, Ca, Ti. Mn, Fe, Co, Sr, Y, Zr, Ba, La, Ce, Pr, Nd, and combinations thereof. The mixed metal inorganic oxide can, for example, comprise $CaMnO_3$; $BaCe_xZn_{1-x}O_3$, wherein x can be from 0 to 1; or a combination thereof. For example, the mixed metal inorganic oxide can comprise $BaCe_xZr_{1-x}O_3$, wherein x can be 0 or more (e.g., 0.1 or more, 0.2 or more, 0.3 or more, 0.4 or more, 0.5 or more, 0.6 or more, 0.7 or more, or 0.8 or more). In some examples, the mixed metal can inorganic oxide can comprise $BaCe_xZr_{1-x}O_3$, wherein x can be 1 or less (e.g., 0.9 or less, 0.8 or less, 0.7 or less, 0.6 or less, 0.5 or less, 0.4 or less, 0.3 or less, or 0.2 or less). The value of x in the mixed metal inorganic oxide $BaCe_xZr_{1-x}O_3$, can range from any of the minimum values described above to any of the maximum values described above. For example, the mixed metal inorganic oxide can comprise $BaCe_xZr_{1-x}O_3$ wherein x can be from 0 to 1 (e.g., from 0 to 0.5, from 0.5 to 1, from 0 to 0.2, from 0.2 to 0.4, from 0.4 to 0.6, from 0.6 to 0.8, from 0.8 to 1, from 0.2 to 1, or from 0.4 to 0.8).

The coating can, for example comprise the mixed metal inorganic oxide in an amount of 0.5 wt % or more, based on the total weight of the coating (e.g., 1 wt % or more, 1.5 wt % or more, 2 wt % or more, 2.5 wt % or more, 3 wt % or more, 3.5 wt % or more, 4 wt % or more, 4.5 wt % or more, 5 wt or more, 5.5 wt % or more, 6 wt % or more, 6.5 wt % or more, 7 wt % or more, 7.5 wt % or more, 8 wt % or more, 8.5 wt % or more, 9 wt % or more, 9.5 wt % or more, 10 wt % or more, 11 wt % or more, 12 wt % or more, 13 wt % or more, 14 wt % or more, 15 wt % or more, 16 wt % or more, 17 wt % or more, or 18 wt % or more). In some examples, the coating can comprise the mixed metal inorganic oxide in an amount of 20 wt % or less, based on the total weight of the coating (e.g., 19 wt % or less, 18 wt % or less, 17 wt % or less, 16 wt % or less, 15 wt % or less, 14 wt % or less, 13 wt % or less, 12 wt % or less, 11 wt % or less, 10 wt % or less, 9.5 wt % or less, 9 wt % or less, 8.5 wt % or less, 8 wt % or less, 7.5 wt % or less, 7 wt % or less, 6.5 wt % or less, 6 wt % or less, 5.5 wt % or less, 5 wt % or less, 4.5 wt % or less, 4 wt % or less, 3.5 wt % or less, 3 wt % or less, 2.5 wt % or less, or 2 wt % or less). The amount of mixed metal inorganic oxide in the coating can range from any of the minimum values described above to any of the maximum values described above. For example, the coating can comprise the mixed metal inorganic oxide in an amount of from 0.5 wt % to 20 wt % based on the total weight of the coating (e.g., from 0.5 wt % to 15 wt %, from 0.5 wt % to 10 wt %, from 0.5 wt % to 7.5 wt %, or from 1 wt % to 5 wt %).

Also disclosed herein are substrates, said substrates having a surface, wherein any of the coatings described herein are provided as a coating on the surface of the substrates, wherein the second region is adjacent the surface of the substrate, and the first region is adjacent the second region. The substrate can be any material to which the coating will bond. For example, the substrate can be a cracking coil, quench exchanger, or other downstream equipment used for olefin production or steam pyrolysis. In some examples, the substrate can comprise a tube and/or pipe that can be used in petrochemical processes such as cracking of hydrocarbons and in particular the cracking of ethane, propane, butane, naphthas, and gas oil, or mixtures thereof.

Hydrocarbon processing in the manufacture of petrochemicals is carried out in processing equipment that includes tubing, piping, fittings and vessels of broad geometries and alloy compositions, any of which can be used as the substrate. These components are generally made of ferrous-based alloys designed to provide adequate chemical, mechanical and physical properties for process containment, and resistance to a range of materials degradation processes. In commercial applications operating above 500° C., austenitic stainless steels are often used ranging from 300 series alloys through to 35Cr-45Ni—Fe alloys, with the level of nickel and chromium in the alloy generally increasing with operating temperature. Above 800° C., a sub-group of these austenitic steels are used and are collectively known as high-temperature alloys (HTAs) or heat-resistant alloys. These HTA steels range from 25Cr-20Ni-Fe (HK40) through to 35Cr-45Ni-Fe (or higher), plus alloying additives in cast form, and similar compositions in wrought form. The classification and composition of such steels are known to those skilled in the art.

In some examples, the coatings and/or substrates can be used in furnace tubes and/or pipes used for the cracking of alkanes (e.g. ethane, propane, butane, naphtha, and gas oil, or mixtures thereof) to olefins (e.g. ethylene, propylene, butene, etc.). Generally, in such an operation a feedstock (e.g. ethane) is fed in a gaseous form to a tube, pipe or coil. The tube or pipe runs through a furnace generally maintained at a temperature from 900° C. to 1150° C. and the outlet gas generally has a temperature from 800° C. to 900° C. As the feedstock passes through the furnace it releases hydrogen (and other byproducts) and becomes unsaturated (e.g. ethylene). The typical operating conditions such as temperature, pressure and flow rates for such processes are well known to those skilled in the art.

The selection of a substrate compatible with the operating environment and also compatible with coating formulation is considered. In some examples, the substrate can be made from a high temperature alloy (HTA). The HTA can be, in some examples, nickel-chromium-based alloy (e.g., an austenitic steel), a nickel-cobalt-based superalloy, or a combination thereof. Examples of HTAs include, but are not limited to, HK40, 800-series (e.g., 800, 800H, 800HT), 25Cr-35Ni-Fe, 35Cr-45Ni-Fe, 40Cr-50Ni-Fe, superalloys, and the like, any of which can further include microalloying elements.

The coatings described herein can be used, for example, on substrates that comprise metal alloy components susceptible to carbon-based fouling (coking), corrosion and erosion in hydrocarbon processing at elevated temperatures. The coatings can generate and sustain surfaces that can catalytically gasify carbonaceous matter, can be inert to filamentous-coke formation, and can provide a net positive economic impact to hydrocarbon manufacturing processes. The coatings can be functionally-graded such that they can achieve both the outermost surface catalytic properties required, and a broad range of chemical, physical and thermo-mechanical properties needed to survive the severe operating conditions of hydrocarbon processing, specifically, petrochemicals manufacture that can exceed 800° C.

Commercial applications of such coatings and/or coated substrates include furnace components used to manufacture major petrochemicals such as olefins by hydrocarbon steam pyrolysis in which temperatures may exceed 1100° C. These coatings and surfaces can increase operating efficiency by gasification of carbonaceous deposits, reduce filamentous coke formation, and positively impact the overall pyrolysis process and product stream.

Also disclosed herein are methods of making the coatings and coated substrates described herein.

The methods of making the coatings can comprise forming a mixture of powders, such as a mixture of metal powders, that is subsequently applied to the desired substrate. The mixture of powders can be formed, for example, by mixing two or more powders. Mixing can be accomplished by mechanical agitation, for example mechanical stirring, shaking (e.g., using a 3-dimensional shaker-mixer), vortexing, sonication (e.g., bath sonication, probe sonication), grinding, milling (e.g., air-attrition milling (jet milling) or ball milling), and the like. The powders can, for example, be in elemental form. In some examples, the powders can be processed (e.g., screened) to have a desired size distribution. For example, the powders can be processed (e.g., screened) to have a diameter of 45 microns or less. In some embodiments, the powders have a size distribution having a diameter of 10 microns or less (e.g., 9 microns or less, 8 microns or less, 7 microns or less, 6 microns or less, 5 microns or less, 4 microns or less, 3 microns or less, 2 microns or less, or 1 micron or less).

In some examples, the methods can comprise forming the mixture of powders, such as a mixture of metal powders. The mixture of powders can, for example, comprise a first metal powder comprising Ni, Fe, W, Cr, Co, Mn, Ti, Mo, V, Nb, Zr, Si, C, or a combination thereof; and a second powder comprising an alkaline earth metal, an alkaline earth oxide, an alkaline earth carbonate, an alkaline earth silicate, molybdenum, a molybdenum oxide, a molybdenum carbide, a mixed-metal perovskite, a mixed metal inorganic oxide, or a combination thereof.

The methods of making the coatings can comprise applying a mixture of powders to the surface of the substrate. Application of the powder mixture can be performed by a range of techniques capable of delivering powder-based formulations to the surface of the substrate. Such techniques include, but are not limited to, spray coating, dip coating, roll coating, and tape casting. Depending on the application process selected, the powder mixture can be dispersed in a liquid form, a slurry form, or a quasi-solid form, with additions of aqueous and/or organic components known to those versed in the art and appropriate to the compositional formulations noted above (e.g., binder, plasticizer, and/or solvent). In some examples, after the powder mixture has been applied to the substrate, the substrate with the powder mixture applied thereto is allowed to dry (e.g., by application of heat and/or ventilation).

The methods can, in some examples, further comprise performing a first heat treatment on the substrate coated with the powder mixture. The purpose of the heat treatment is to remove organic components in the coating (e.g. binder, plasticizer and solvent) prior to further processing. This can be accomplished at temperatures up to 400° C. under an inert atmosphere or vacuum. Examples of inert atmospheres include, but are not limited to, argon, neon, helium, or combinations thereof. The concentration of reactive gases, such as oxygen and nitrogen, in the atmosphere during the heat treatment should be kept low. In certain examples, a vacuum is first drawn and then 15 torr of argon is introduced to the vacuum chamber in which the heat treatment is performed. The time for which the first heat treatment occurs can, for example, range from 1 hour to 12 hours (e.g., from 2 hours to 10 hours, from 4 hours to 8 hours, or from 5.5 hours to 6.5 hours).

Following the first heat treatment, a second heat treatment can be performed. The purpose of the second heat treatment is to consolidate the coating, e.g., thereby forming a consolidated coating. In the consolidation process, the powder mixture interdiffuses and densifies into a defined microstructure (e.g., with defined regions) that is well-adherent to the substrate. The temperature of consolidation can, for example, range from 900 to 1200° C. (e.g., from 1000° C. to 1200° C., or from 1050° C. to 1150° C.). The time for which the consolidation heat treatment occurs can, for example, range from 1 hour to 6 hours (e.g., from 2 hours to 4 hours, or from 2.5 hours to 3.5 hours). The temperature and/or time of consolidation can be selected based on the base material or steel alloy composition (e.g., the nature of the substrate, if present), coating formulation, and the targeted coating microstructure.

The heat treatment can, for example, be conducted in a vacuum and/or in an inert atmosphere. Examples of inert atmospheres include, but are not limited to, argon, neon, helium, or combinations thereof. The concentration of reactive gases, such as oxygen and nitrogen, in the atmosphere during the heat treatment should be kept low. In certain examples, a vacuum is first drawn and then 1-2 torr of argon is introduced to the vacuum chamber in which the heat treatment is performed.

Following heat treatment consolidation, the methods can, for example, further comprise subjecting the coated substrate to oxidation at high temperature to generate the first region adjacent to and in contact with the second region. Prior to final surface generation (oxidation) of the coating, standard cleaning procedures can be used to achieve the desired level of surface cleanliness and surface finish. An initial hydrogen treatment can, in some examples, be used to reduce surface oxide species and remove carbonaceous contaminants such as organic cutting fluids. After consolidation and cleaning, final surface generation can be achieved by heating the coating under a controlled atmosphere comprising oxygen. The temperature of controlled oxidation can, for example, range from 600 to 1000° C. (e.g., from 700° C. to 900° C., or from 750° C. to 950° C.). The time for which the controlled oxidation occurs can, for example, be 12 hours of less (e.g., from 2 hours to 12 hours). The concentration of oxygen during the controlled oxidation can, for example, be from 2% to 30% (e.g., from 2% to 20%, from 4% to 10%, or from 6% to 8%). Depending on the oxygen concentration during the controlled oxidation, the temperature at which the controlled oxidation is performed, and the time for which the controlled oxidation is performed, different oxide compositions, crystal structures, and morphologies can be produced.

In some examples, a precursor material is incorporated into the coating for subsequent conversion into a stable oxide catalyst (e.g., alkaline earth oxide, a molybdenum oxide, a mixed-metal perovskite, a mixed metal inorganic oxide, or a combination thereof). This can be accomplished either in a separate high temperature oxidation step after coating or in-situ during hydrocarbon cracking. For example, Mo powder and/or molybdenum carbide can be added to the coating instead of Mo-oxide. After oxidation at high temperature, active Mo-oxide catalyst can form at the surface or within the coating. In another example, an alkaline earth carbonate can be added to the coating instead of an alkaline earth oxide. After oxidation at high temperature, active alkaline earth oxide catalyst can form at the surface or within the coating.

In some examples, Cr is added to the coating in the form of metal powder. This can reduce Cr migration from the underlying substrate into the coating and thereby increase the substrate lifetime under production conditions.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Unless indicated otherwise, parts and percentages are parts and percentages by weight and temperature is in ° C. There are numerous variations and combinations of measurement conditions, e.g., component concentrations, temperatures, pressures and other measurement ranges and conditions that can be used to optimize the described process.

Example 1

MERT (Mixing Element Radiant Tube) is an anti-coking technology for reducing coke deposition and increasing cracker run-time between decoking (U.S. Pat. No. 5,950,718). MERT is an engineering solution based on disrupting the flow within the steam cracker tube by welding a spiral bead to the interior wall of the cracker tube. Improved mixing and heat transfer is claimed which results in lower tube metal temperatures, reduced filamentous coke formation, slower amorphous coke deposition and longer run times between de-cokes. Although MERT has shown some acceptance by the industry, tube coating technologies that can either minimize the formation of coke or destroy it quickly after it has formed are strongly desired.

Cracker tube coatings can be broadly grouped into two categories, those that passivate the surface (i.e., cover reactive Ni and Fe atoms) and block formation of filamentous coke, or those that catalytically oxidize deposited coke in the presence of steam to form CO and $CO_2$. Passivation technologies are typically focused on the development of new tube alloys that can form a very thin but inert aluminum oxide layer on the cracker tube surface when exposed to a high temperature oxidative environment. In theory, by covering the reactive metallic Ni and Fe sites on the interior wall of the steam cracker tube, formation of filamentous (catalytic) coke will be blocked. Although several technologies based on this principle have been introduced to the market, none has proven effective for significantly increasing run time between steam cracker decoking. One key disadvantage of this approach is that the coating has no impact on the formation of amorphous (gas phase) coke. Since amorphous coke predominates under high coking environments (e.g., naphtha or high severity ethane cracking), technologies that can minimize the impact of amorphous coke are needed.

Described herein are catalytic coatings designed with the dual purpose of blocking formation of filamentous coke (i.e. passivating the steel tube surface) while oxidizing deposited amorphous coke during normal cracking operation. The coatings described herein can increase cracker runtime between decoking and have a negligible impact on olefin product consumption, and further has appreciable gasification benefit under high coking environments (e.g., naphtha or high severity ethane cracking).

The coatings described herein comprise oxide based gasifiers with higher activity for coke oxidation than Mn-based technology. The metal based coating adheres well to steel cracker tubes and is durable over the life of the steam cracker coil. As long as an adherent and stable coating is prepared with sufficient oxide exposed at the surface, gasification of coke deposited thereon is possible. The desired level of coke gasification activity relative to unwanted consumption of cracking products such as ethylene or propylene can be optimized by adjusting the level of oxide catalyst present.

In lab-scale powder testing involving the reaction of graphite (coke surrogate) with potential oxide-based catalysts at 900° C. in the presence of 75% steam/nitrogen, numerous candidates were identified with gasification activity higher than that of MnO. The candidates include alkaline earth oxides (e.g., MgO, CaO, SrO and BaO), alkaline earth carbonates (e.g., $MgCO_3$, $CaCO_3$, $SrCO_3$, and $BaCO_3$), molybdenum oxides ($MoO_2$ and $MoO_3$), MoC, mixed metal inorganic oxides ($CaMnO_3$, $BaCe_xZr_{1-x}O_3$), and mixed-metal perovskites ($SrCoO_3$, $La)Sr_{1-y}CoO_3$, $La_ySr_{1-y}FeO_3$, $La_ySr_{1-y}MnO_3$, $La_yCa_{1-y}MnO_3$, $Pr_yCa_{1-y}MnO_3$, $BaZrO_3$, and $BaTiO_3$).

To prepare the samples for testing, powders of the candidate oxide and graphite were mixed by grinding together (graphite amount constant at 0.5 g). To test the graphite gasification performance, the mixture was then heated to 900° C. at 10° C./min in a mixture of 750 cc/min steam and 250 cc/min $N_2$ (75% steam). The sample was then held at 900° C. for 60 minutes. During the powder testing, $H_2$ evolution was monitored as an indicator for splitting of water ($H_2+O_2$) by the oxide catalyst, while $CO_2$ evolution was monitored to quantify oxidation of coke via the released oxygen.

For the MnO catalyst, a comparison of the $CO_2$ concentration evolved as a function of the MnO:graphite ratio is shown in FIG. 1 and Table 1. Compared to the graphite only control sample, only slight activity was observed for the sample prepared with a 1:1 MnO:graphite ratio, while significant MnO gasification activity was observed for the sample prepared with a 10:1 MnO:graphite ratio (FIG. 1, Table 1). As shown in FIG. 1, the gasification activity is sustained, indicating the process is catalytic.

TABLE 1

Comparison of MnO:graphite ratio to the average concentration of $CO_2$ produced.

| MnO:graphite Ratio | $[CO_2]$ (%) |
|---|---|
| 10:1 | 0.45 |
| 1:1 | 0.14 |
| Graphite only | 0.12 |

Figure 2:
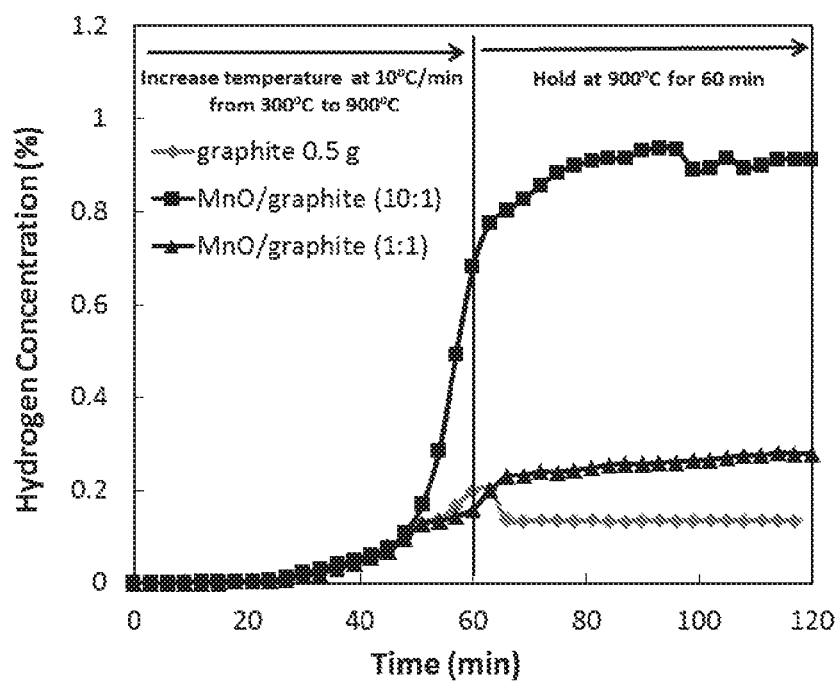
FIG. 2 shows the concentration of $H_2$ evolved from a mixture of graphite and MnO at 900° C. in an atmosphere of 75% steam/nitrogen as a function of the MnO:graphite ratio.

A comparison of the $H_2$ concentration evolved as a function of the MnO:graphite ratio is shown in FIG. 2 and Table 2. The evolution of $H_2$ parallels that of $CO_2$. Compared to the graphite only control sample, only slight activity was observed for the sample prepared with a 1:1 MnO:graphite ratio, while significant activity was observed for the sample prepared with a 10:1 MnO:graphite ratio (FIG. 2, Table 2). As shown in FIG. 2, the activity is sustained, indicating the process is catalytic.

TABLE 2

Comparison of MnO:graphite ratio to the average concentration of $H_2$ produced.

| MnO:graphite Ratio | $[H_2]$ (%) |
|---|---|
| 10:1 | 0.88 |
| 1:1 | 0.25 |
| Graphite only | 0.14 |

The proposed mechanism is based on the oxidation of the MnO by steam resulting in the formation of transient higher Mn oxides ($MnO_{1+x}$) and the release of $H_2$. In turn, the coke is oxidized by the $MnO_{1+x}$ resulting in the release of $CO_2$.

Figure 3:
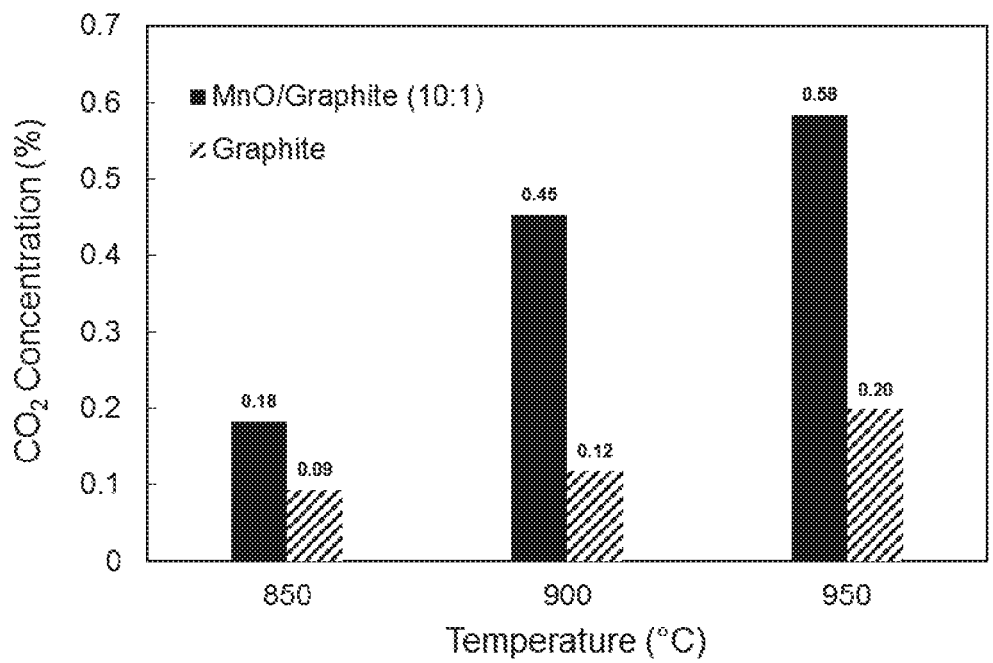
FIG. 3 shows the impact of reaction temperature on the concentration of $CO_2$ evolved from a mixture of graphite and MnO at 900° C. in an atmosphere of 75% steam/nitrogen.

The MnO:graphite 10:1 sample was used to further investigate the impact of the reaction temperature on the concentration of $CO_2$ produced. As shown in FIG. 3, the concentration of $CO_2$ released increased as the reaction temperature increased from 850° C. to 950° C.

Figure 4:
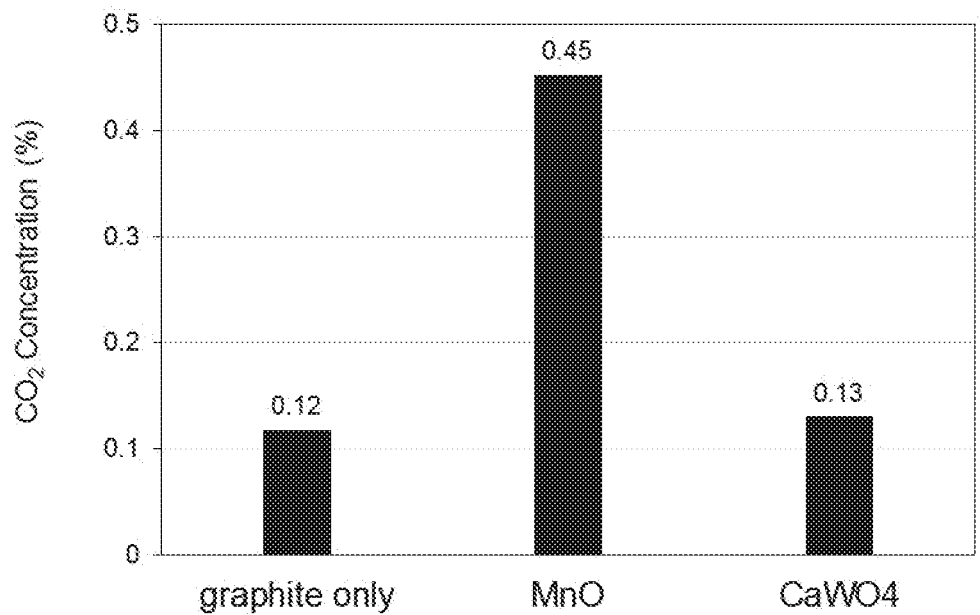
FIG. 4 shows the $CO_2$ concentration evolved from a mixture of graphite and various catalysts (10:1 catalyst to graphite weight ratio) at 900° C. in an atmosphere of 75% steam/nitrogen.

FIG. 4 shows the concentration of $CO_2$ released at a reaction temperature of 900° C. for a graphite control, a 10:1 MnO:graphite sample, and a 10:1 $CaWO_4$:graphite sample; the 10:1 MnO:graphite sample has the highest activity, while the 10:1 $CaWO_4$:graphite sample has comparable activity to the graphite control.

Figure 5:
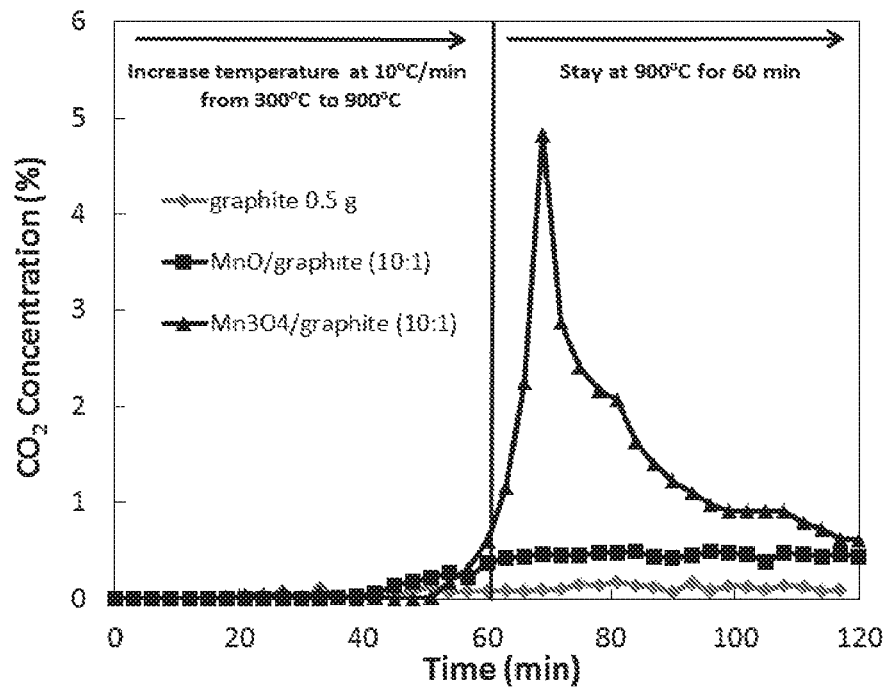
FIG. 5 shows the $CO_2$ concentration evolved from a mixture of graphite and MnO or $Mn_3O_4$ catalysts (10:1 catalyst to graphite weight ratio) at 900° C. in an atmosphere of 75% steam/nitrogen.
Figure 6:
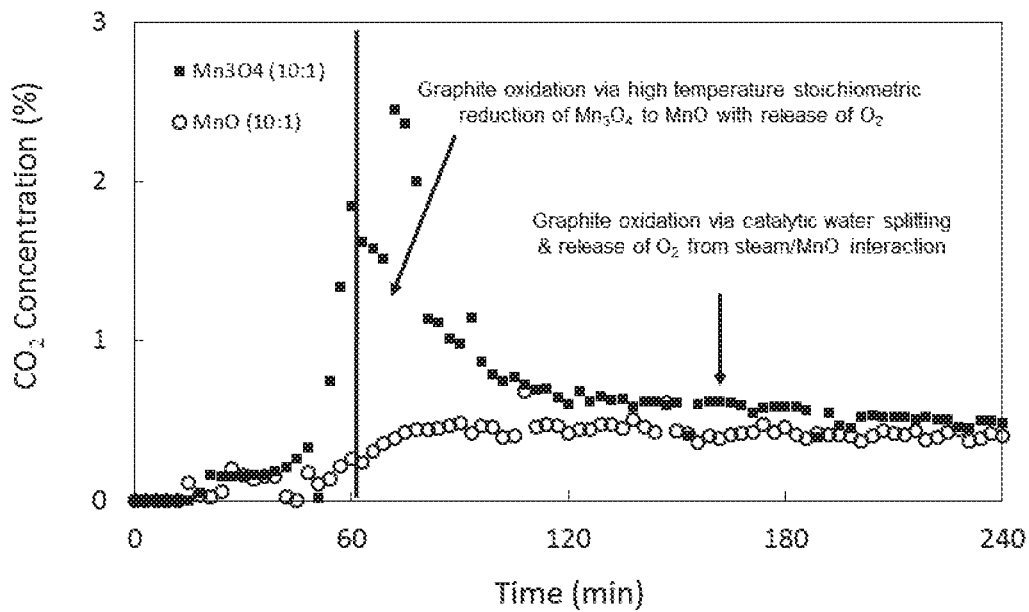
FIG. 6 shows the $CO_2$ concentration evolved after longer reaction time from a mixture of graphite and MnO or $Mn_3O_4$ catalysts (10:1 catalyst to graphite weight ratio) at 900° C. in an atmosphere of 75% steam/nitrogen.

FIG. 5 shows the concentration of $CO_2$ released at a reaction temperature of 900° C. for a graphite control, a 10:1 MnO:graphite sample, and a 10:1 $Mn_3O_4$:graphite sample. While the $Mn_3O_4$ catalyst shows an initial high release of $CO_2$, over time the levels drop significantly. The initial high release of $CO_2$ is due to decomposition of the $Mn_3O_4$ catalyst with subsequent release of $O_2$. FIG. 6 shows a comparison of $Mn_3O_4$ and MnO after extended reaction time at a temperature of 900° C. Presumably, at high temperature the $Mn_3O_4$ catalyst decomposes to MnO with the subsequent release of $O_2$. As seen in FIG. 6, once the $Mn_3O_4$ has been reduced to MnO, the gasification activity is comparable to that of the 10:1 MnO:graphite catalyst. The long-term gasification activity of the $Mn_3O_4$ catalyst approaches that of MnO, confirming that the MnO is the active catalytic gasification component.

Figure 7:
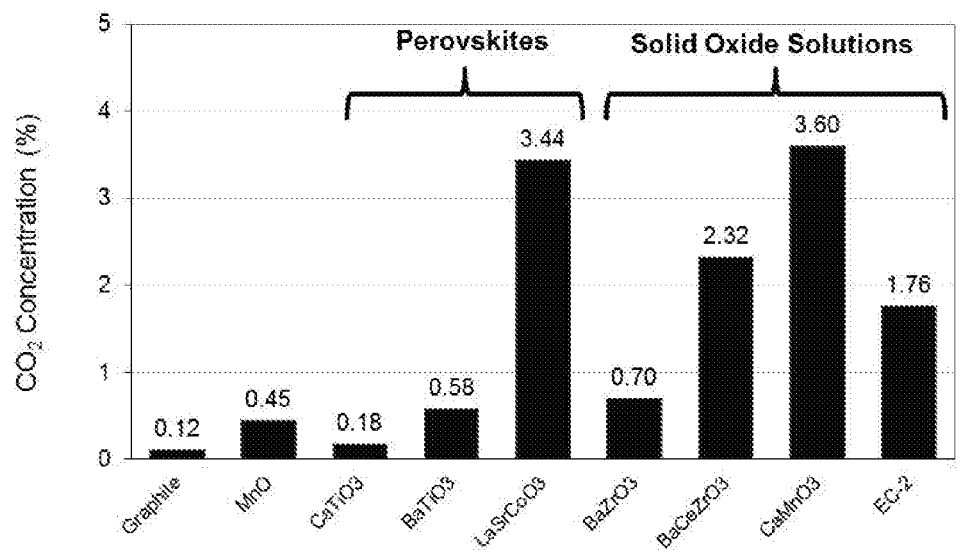
FIG. 7 shows a summary of the average $CO_2$ concentration released from a mixture of graphite and various perovskite and solid oxide containing catalysts (10:1 catalyst to graphite weight ratio) at 900° C. in an atmosphere of 75% steam/nitrogen.

The impact of the addition of perovskites and solid oxide solutions to the graphite mixture was further investigated. Several perovskites ($La_ySr_{1-y}CoO_3$; $La_{0.5}Sr_{0.5}XO_3$, where X is Fe, Mn, and/or Co; $LaMnO_3$; $BaC_{0.5}Zr_{0.5}O_3$ (BCZ); and $Ca_xMn_{1-x}O_3$) were synthesized using a citric acid method (U.S. Pat. No. 8,943,811; Mukai et al. *Applied catalysis A. General* 2013, 458, 71-81; Spinicci et al. *Journal of Molecular Catalysis A: Chemical* 2003, 197, 147-155). Using XRD analysis, it was determined that all the above, except $BaCe_{0.5}Zr_{0.5}O_3$ (BCZ) and $Ca_xMn_{1-x}O_3$, had the perovskite structure. Four commercial samples (EC-2, $CaTiO_3$, $BaTiO_3$, and $BaZrO_3$) were also tested. Of these, $CaTiO_3$ and $BaTiO_3$ were found to have the perovskite structure by XRD. The gasification activities of the samples were tested as described above. The $CO_2$ concentration produced for the perovskite and solid oxide catalysts mixed with graphite (10:1 weight ratio) at 900° C. are shown in FIG. 7. As can be seen in FIG. 7, the perovskite structure is not required for high gasification activity. Subsequent measurement of BET surface area for the various perovskites and mixed oxides also confirmed that high surface area is not required for high gasification activity. However, the results from FIG. 7 indicate that Ca, Ba, and/or Sr may be key components for high gasification activity. The average concentration of evolved $CO_2$ and $H_2$ for the various perovskites and solid oxide solutions mixed with graphite at 900° C. are summarized in Table 3.

TABLE 3

$CO_2$ and $H_2$ results for perovskites and solid oxide solutions at 900° C.

| Oxide | Average $CO_2$ concentration (%) | Average $H_2$ concentration (%) |
|---|---|---|
| Commercial EC-2 | 1.76 | 3.40 |
| Commercial $CaTiO_3$ | 0.18 | 0.25 |
| Commercial $BaTiO_3$ | 0.58 | 1.07 |
| Commercial $BaZrO_3$ | 0.70 | 1.53 |
| $La_{0.67}Sr_{0.33}CoO_3$ | 3.44 | 5.2 |
| $La_{0.5}Sr_{0.5}CoO_3$ | 2.0 | 3.59 |
| $La_{0.5}Sr_{0.5}MnO_3$ | 2.14 | 4.33 |
| $La_{0.5}Sr_{0.5}FeO_3$ | 1.41 | 2.31 |
| $LaMnO_3$ | 0.43 | 0.75 |
| $Ca_xMn_{1-x}O_3$ | 3.60 | 5.46 |
| $BaCe_{0.5}Zr_{0.5}O_3$ | 2.32 | 4.59 |
| MnO (reference) | 0.45 | 0.88 |

Figure 8:
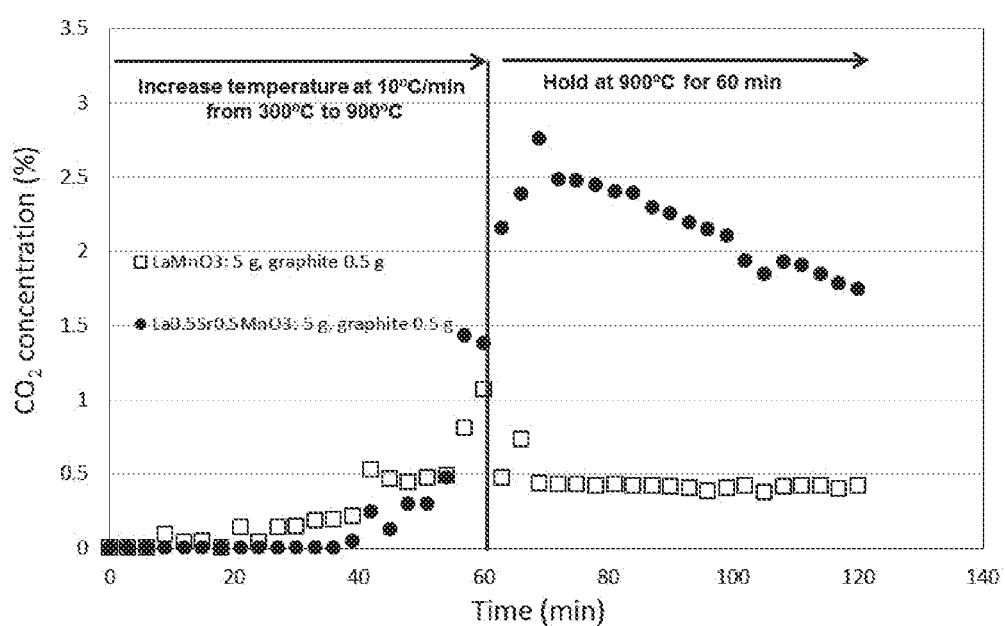
FIG. 8 shows the effect of Sr addition to a La—Mn perovskite catalyst on the $CO_2$ concentration evolved from a mixture of graphite and the perovskite catalyst (10:1 catalyst to graphite weight ratio) at 900° C. in an atmosphere of 75% steam/nitrogen.
Figure 9:
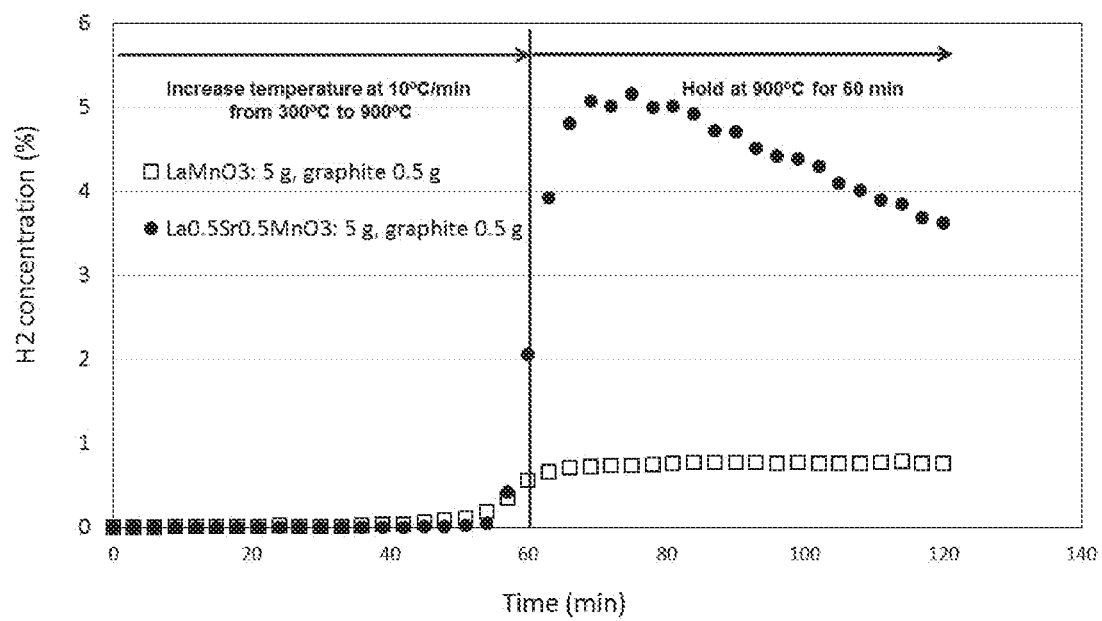
FIG. 9 shows the effect of Sr addition to a La—Mn perovskite catalyst on the $H_2$ concentration evolved from a mixture of graphite and the perovskite catalyst (10:1 catalyst to graphite weight ratio) at 900° C. in an atmosphere of 75% steam/nitrogen.

The effect of Sr addition to the perovskites on the steam gasification of graphite at 900° C. was investigated by comparing the $CO_2$ concentration produced for a $LaMnO_3$ perovskite catalyst with that of a $La_{0.5}Sr_{0.5}MnO_3$ perovskite catalyst (FIG. 8). X-ray diffraction (XRD) showed that both the $LaMnO_3$ and $La_{0.5}Sr_{0.5}MnO_3$ were perovskite materials. As can be seen from the results in FIG. 8, the addition of Sr significantly improved the gasification activity. A similar effect was seen for the $H_2$ concentration released (FIG. 9).

Figure 10:
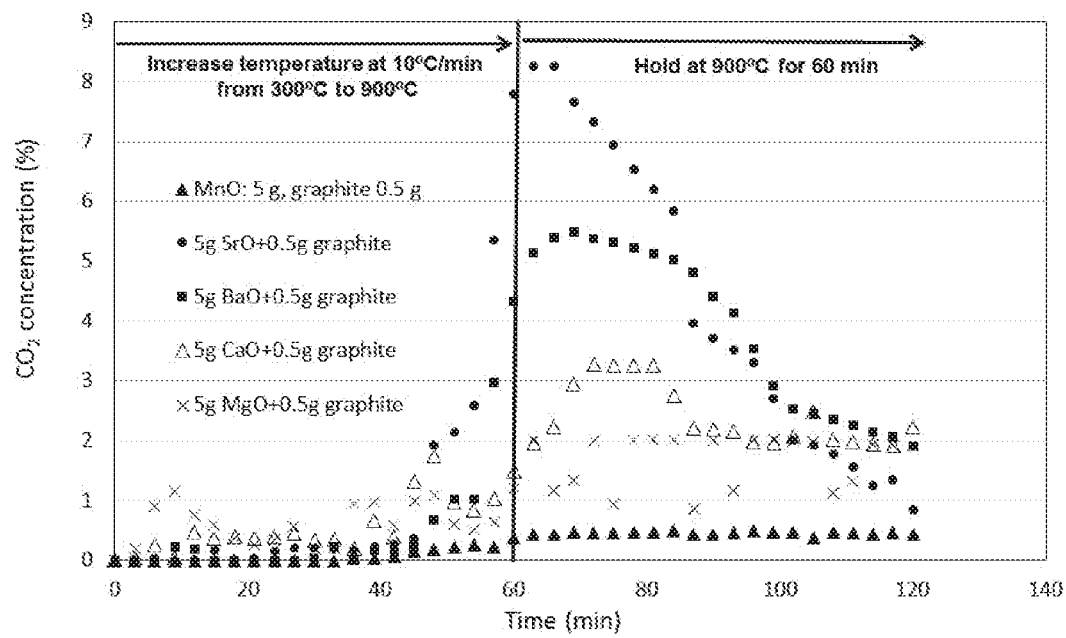
FIG. 10 shows the $CO_2$ concentration released from a mixture of graphite and various alkaline earth oxide catalysts (10:1 catalyst to graphite weight ratio) at 900° C. in an atmosphere of 75% steam/nitrogen.
Figure 11:
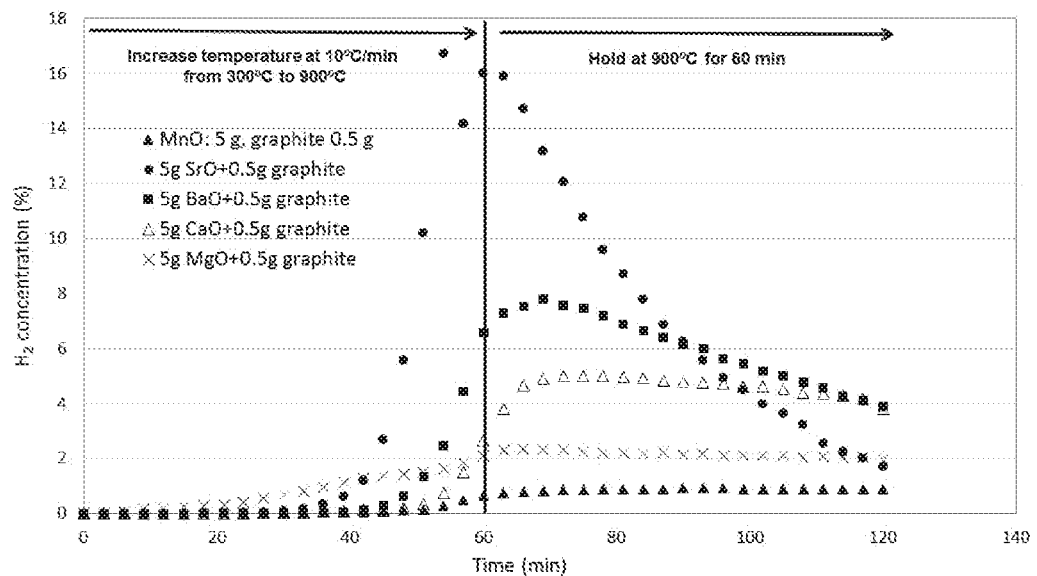
FIG. 11 shows the $H_2$ concentration released from a mixture of graphite and various alkaline earth oxide catalysts (10:1 catalyst to graphite weight ratio) at 900° C. in an atmosphere of 75% steam/nitrogen.

The impact of the addition of alkaline earth oxide (MgO, CaO, SrO, BaO), alkaline earth carbonate ($MgCO_3$, $CaCO_3$, $SrCO_3$, $BaCO_3$), and KOH catalysts to the graphite mixture was further investigated at two catalyst to graphite weight ratios (10:1 and 1:1). As can be seen in FIG. 10, all alkaline earth oxides (10:1 ratio) show a higher gasification activity than MnO. The gasification activities of SrO and BaO are high, and most of the graphite was consumed within one hour at 900° C. with 75% steam for these samples. The $H_2$ released shows a similar trend (FIG. 11).

Figure 12:
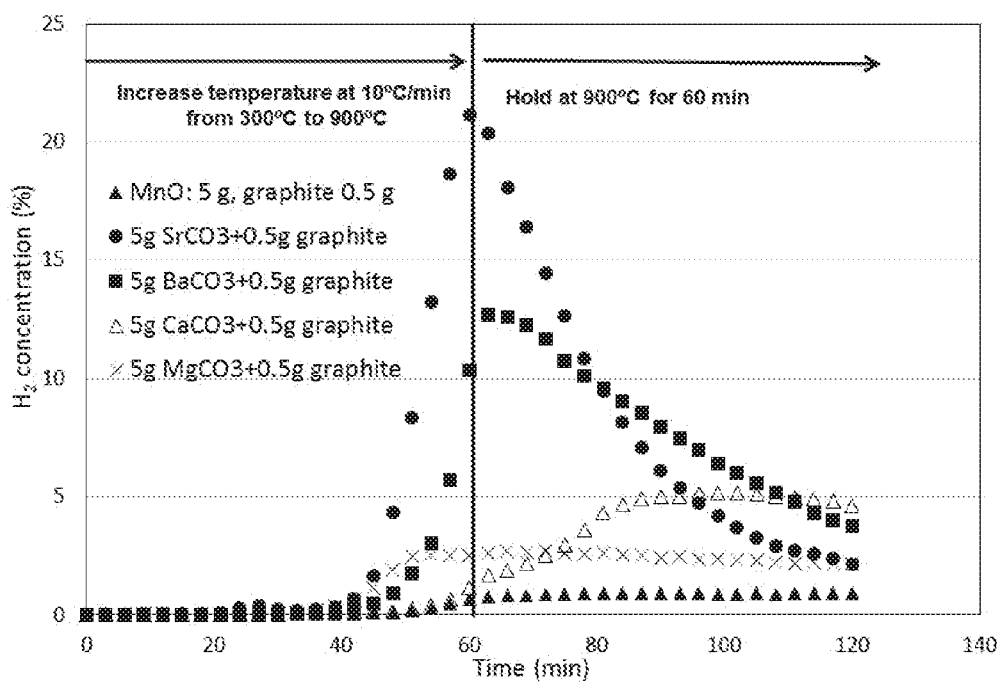
FIG. 12 shows the $H_2$ concentration released from a mixture of graphite and various alkaline earth carbonate catalysts (10:1 catalyst to graphite weight ratio) at 900° C. in an atmosphere of 75% steam/nitrogen.

As can be seen in FIG. 12, all alkaline earth carbonates (10:1 weight ratio with graphite) also show higher gasification that MnO. Similar to the alkaline earth oxide results, the gasification activities of $SrCO_3$ and $BaCO_3$ are high, and most of the graphite was consumed within one hour at 900° C. with 75% steam for these samples.

Figure 13:
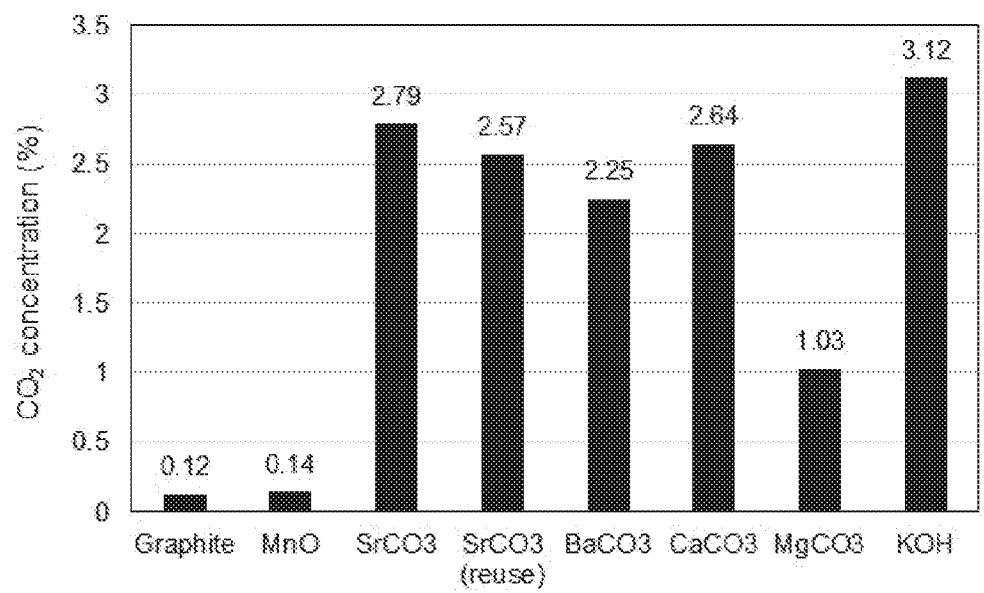
FIG. 13 shows a summary of the average $CO_2$ concentration released from a mixture of graphite and various alkaline earth carbonate catalysts (1:1 catalyst to graphite weight ratio) at 900° C. in an atmosphere of 75% steam/nitrogen.
Figure 14:
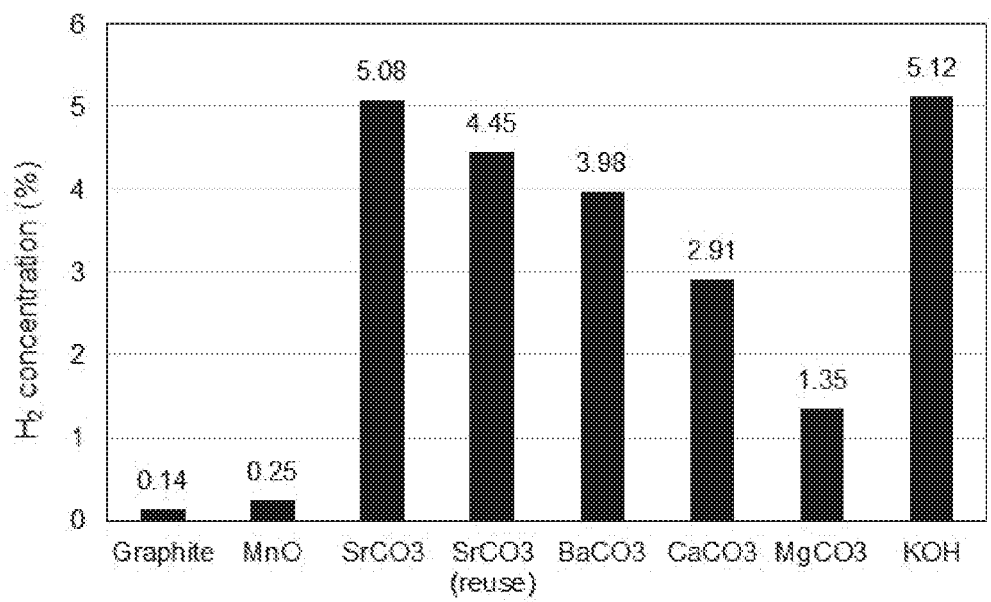
FIG. 14 shows a summary of the average $H_2$ concentration released from a mixture of graphite and various alkaline earth carbonate catalysts (1:1 catalyst to graphite weight ratio) at 900° C. in an atmosphere of 75% steam/nitrogen.

The $CO_2$ formation (FIG. 13) and $H_2$ formation (FIG. 14) results at 900° C. for alkaline earth carbonates and KOH mixed with graphite at a 1:1 catalyst to graphite weight ratio indicate that all show very high gasification activity. The higher $CO_2$ release relative to the corresponding results for the alkaline earth oxides is due to the added effect of carbonate decomposition. For the KOH:graphite mixture, most of the graphite was consumed during 1 hour of gasification at 900° C. In general, the activity follows the trend: K>Sr>Ba>Ca>Mg. The average $CO_2$ and $H_2$ concentrations released for alkaline earth oxides, alkaline earth carbonates, and KOH at 900° C. are summarized in Table 4.

TABLE 4

$CO_2$ and $H_2$ results for alkaline earth oxides, alkaline earth carbonates, and KOH at 900° C.

| Oxide | Oxide:graphite ratio (wt) | Average $CO_2$ concentration (%) | Average $H_2$ concentration (%) |
|---|---|---|---|
| MgO | 10 | 1.68 | 2.17 |
| CaO | 10 | 2.40 | 4.61 |
| SrO | 10 | 4.24* | 7.01 |
| BaO | 10 | 3.88* | 6.00 |
| $CaCO_3$ | 10 | 5.20 | 4.18 |
| $SrCO_3$ | 10 | 4.20* | 7.88 |
| $SrCO_3$ (reuse) | 10 | 4.06 | 7.63 |
| $SrCO_3$ | 1 | 2.79 | 5.08 |
| $SrCO_3$ (reuse) | 1 | 2.57 | 4.45 |
| $BaCO_3$ | 10 | 4.94* | 7.97 |
| $BaCO_3$ | 1 | 2.25 | 3.98 |
| $CaCO_3$ | 1 | 2.64 | 2.91 |
| $MgCO_3$ | 10 | 1.45 | 2.43 |
| $MgCO_3$ | 1 | 1.03 | 1.35 |
| KOH | 1 | 3.12 | 5.12 |
| MnO (reference) | 10 | 0.45 | 0.88 |

*most of C was gasified

Example 2

A coating was prepared by combining Fe, Ni, W, Si and Mn metal powders with 5% $La_{0.4}Sr_{0.6}CoO_3$ perovskite a binder (polyvinyl butyral), and a plasticizer (benzyl butyl phthalate) in toluene. After thorough mixing, the resulting slurry was coated onto small (0.75"×1") coupons cut from steam cracker tubes. After drying, the coupons were heated to 340° C. under vacuum with the addition of 15 torr argon to remove most of the organic binder and plasticizer. Subsequently, the coupons were heated to 1100° C. under vacuum with the addition of 1-2 torr of argon to densify the coating and provide adequate coating adhesion to the steel surface. Last, the coupons were heated to 920° C. in air to oxidize the coating surface. When subjected to hexane cracking at 900° C. in a lab reactor, almost half as much coke was deposited on the coupon comprising 5% $La_{0.4}Sr_{0.6}CoO_3$ relative to an identically treated coupon without the $La_{0.4}Sr_{0.6}CoO_3$.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A coating comprising:
   a first region having a first thickness, the first region comprising a manganese oxide, a chromium-manganese oxide, or a combination thereof; and
   a second region having a second thickness, the second region comprising Ni, Fe, W, Cr, Co, Mn, Ti, Mo, V, Nb, Zr, Si, C, or a combination thereof;
   wherein the coating includes at least one of an alkaline earth metal, an alkaline earth oxide, an alkaline earth carbonate, an alkaline earth silicate, molybdenum, a molybdenum oxide, a molybdenum carbide, a mixed-metal perovskite, a mixed metal inorganic oxide, or a combination thereof; and
   the coating includes at least one of strontium, strontium silicate, or strontium oxide.

2. The coating of claim 1, wherein the coating includes an alkaline earth metal, an alkaline earth oxide, an alkaline earth carbonate, an alkaline earth silicate, or a combination thereof and the alkaline earth metal, the alkaline earth oxide, the alkaline earth carbonate, the alkaline earth silicate, or combination thereof comprises Mg, Ca, Sr, Ba, or a combination thereof.

3. The coating of claim 1, wherein the coating includes an alkaline earth oxide and the alkaline earth oxide is selected from the group consisting of MgO, CaO, SrO, BaO, and combinations thereof.

4. The coating of claim 1, wherein the coating includes an alkaline earth silicate and the alkaline earth silicate is selected from the group consisting of MgSiO3, CaSiO3, SrSiO3, BaSiO3, or a combination thereof.

5. The coating of claim 1, wherein the coating includes an alkaline earth carbonate and the alkaline earth carbonate is selected from the group consisting of MgCO3, CaCO3, SrCO3, BaCO3, and combinations thereof.

6. The coating of claim 1, wherein the coating comprises an alkaline earth metal, an alkaline earth oxide, an alkaline earth carbonate, an alkaline earth silicate, or a combination thereof in an amount of from 0.5 wt % to 20 wt % based on the total weight of the coating.

7. The coating of claim 1, wherein the coating includes a molybdenum oxide and the molybdenum oxide comprises MoO2, MoO3, or a combination thereof, or wherein the coating includes a molybdenum carbide and the molybdenum carbide comprises MoC.

8. The coating of claim 1, wherein the coating comprises molybdenum, a molybdenum oxide, a molybdenum carbide, or a combination thereof in an amount of from 0.5 wt % to 20 wt % based on the total weight of the coating.

9. The coating of claim 1, wherein the coating includes a mixed metal perovskite and the mixed metal perovskite comprises a first metal and a second metal, wherein the first metal and the second metal are selected from the group consisting of Mg, Al, Ca, Sc, Ti, V, Cr, Mn, Fe, Co, Ni, Cu, Zn, Ga, Sr, Y, Zr, Nb, Mo, Ru, Rh, Pd, Ag, In, Sn, Ba, Ta, W, Re, Ir, Pt, Au, Bi, La, Ce, Pr, Nd, and combinations thereof.

10. The coating of claim 1, wherein coating includes a mixed metal perovskite and the mixed metal perovskite comprises $SrCoO_3$, $La_y Sr_{1-y}CoO_3$, $La_ySr_{1-y}FeO_3$, $La_ySr_{1-y}MnO_3$, $La_yCa_{1-y}MnO_3$, $Pr_yCa_{1-y}MnO_3$, $BaZrO_3$, $BaTiO_3$, or a combination thereof, wherein y is from 0.2 to 1, or from 0.4 to 0.8, and wherein the coating comprises the mixed metal perovskite in an amount of from 0.5 wt % to 20 wt % based on the total weight of the coating.

11. The coating of claim 1, wherein the coating includes a mixed metal inorganic oxide and the mixed metal inorganic oxide comprises a first metal and a second metal, wherein the first metal and the second metal are selected from the group consisting of Mg, Al, Ca, Sc, Ti, V, Cr, Mn, Fe, Co, Ni, Cu, Zn, Ga, Sr, Y, Zr, Nb, Mo, Ag, In, Sn, Ba, Ta, W, Re, Au, Bi, La, Ce, Pr, Nd, and combinations thereof.

12. The coating of claim 1, wherein the coating includes a mixed metal inorganic oxide and the mixed metal inorganic oxide comprises $CaMnO_3$, $BaCe_xZr_{1-x}O_3$, or a combination thereof, wherein x is from 0 to 1.

13. The coating of claim 1, wherein the coating comprises the mixed metal inorganic oxide in an amount of from 0.5 wt % to 20 wt % based on the total weight of the coating.

14. The coating of claim 1, wherein the second region comprises $X_6W_6Z$, XWZ, or a combination thereof, wherein X is independently Ni or a mixture of Ni and one or more transition metals and Z is independently Si, C, or a combination thereof and wherein the one or more transition metals comprise Fe, Zr, Nb, Cr, Co, Mn, Ti, Mo, V, or a combination thereof.

15. The coating of claim 1, wherein the second region comprises Si in an amount of from 1 wt % to 15 wt % based on the total weight of the second region, or wherein the second region comprises Mn in an amount of 1 wt % to 20 wt % based on the total weight of the second region.

16. The coating of claim 1, wherein the thickness of the first region is from 0.1 microns to 20 microns, and wherein the second region has a thickness of from 50 microns to 1,200 microns.

17. The coating of claim 1, wherein the first region includes a manganese oxide and the manganese oxide is selected from the group consisting of MnO, $Mn_2O_3$, $Mn_3O_4$, $MnO_2$, and combinations thereof.

18. The coating of claim 1, wherein the first region includes a chromium-manganese oxide and the chromium-manganese oxide comprises a spinel chromium-manganese oxide, an inverse spinel chromium-manganese oxide, a non-stoichiometric chromium-manganese oxide, or a combination thereof.

19. The coating of claim 1, wherein the first region includes a chromium-manganese oxide and the chromium-manganese oxide comprises $MnCr_2O_4$, $CrMn_2O_4$, or combinations thereof.

20. The coating of claim 1, wherein the second region comprises Ni in an amount of 15-45 wt %, W in an amount of 10-50 wt %, Cr in an amount of 1-15 wt %, Fe in an amount of 1-10 wt %, Mn in an amount of 1-20 wt %, Si in an amount of 1-15 wt %, Nb in an amount of 0-2 wt %, Mo in an amount of 0-15 wt %, Ti in an amount of 0-2 wt %, and Zr in amount of 0-2 wt %, based on the total weight of the second region.

21. A substrate having a surface, wherein the coating of claim 1 is provided as a coating on the surface of the substrate, wherein the second region is adjacent the surface of the substrate, and the first region is adjacent the second region.

22. The substrate of claim 21, wherein the substrate comprises a nickel-chromium-based alloy, a nickel-cobalt-based super alloy, or a combination thereof.

23. The substrate of claim 22, wherein the substrate comprises a nickel-chromium-based alloy and the nickel-chromium-based alloy comprises an austenitic steel.

24. A method of preparing the coating of claim 1 on a substrate, the method comprising:
   applying a mixture of powders to the surface of the substrate, the mixture of powders comprising:
      a first powder comprising Ni, Fe, W, Cr, Co, Mn, Ti, Mo, V, Nb, Zr, Si, C, or a combination thereof; and
      a second powder comprising an alkaline earth metal, an alkaline earth oxide, an alkaline earth carbonate, an alkaline earth silicate, molybdenum, a molybdenum oxide, a molybdenum carbide, a mixed-metal perovskite, a mixed metal inorganic oxide, or a combination thereof; and
   heating the mixture of powders applied to the surface of the substrate in the absence of oxygen under vacuum or under an inert atmosphere to form an initial coating on the surface of the substrate.

* * * * *